US012470784B2

(12) United States Patent
Lemieux et al.

(10) Patent No.: US 12,470,784 B2
(45) Date of Patent: Nov. 11, 2025

(54) INTELLIGENT AUTOMATED CONTENT SUMMARY GENERATION

(71) Applicant: Georgia State University Research Foundation, Inc., Atlanta, GA (US)

(72) Inventors: Anthony Lemieux, Decatur, GA (US); Krishanu Sarker, Marietta, GA (US)

(73) Assignee: Georgia State University Research Foundation, Inc., Atlanta, GA (US)

( * ) Notice: Subject to any disclaimer, the term of this patent is extended or adjusted under 35 U.S.C. 154(b) by 0 days.

(21) Appl. No.: 18/569,040

(22) PCT Filed: Jun. 23, 2022

(86) PCT No.: PCT/US2022/034689
§ 371 (c)(1),
(2) Date: Dec. 11, 2023

(87) PCT Pub. No.: WO2023/278241
PCT Pub. Date: Jan. 5, 2023

(65) Prior Publication Data
US 2024/0267601 A1    Aug. 8, 2024

Related U.S. Application Data

(60) Provisional application No. 63/202,868, filed on Jun. 28, 2021.

(51) Int. Cl.
*H04N 21/8549* (2011.01)
*H04N 21/45* (2011.01)
(Continued)

(52) U.S. Cl.
CPC ..... *H04N 21/8549* (2013.01); *H04N 21/4532* (2013.01); *H04N 21/4666* (2013.01); *H04N 21/8456* (2013.01)

(58) Field of Classification Search
CPC ........... H04N 21/8549; H04N 21/4532; H04N 21/8456; H04N 21/4666
(Continued)

(56) References Cited

U.S. PATENT DOCUMENTS 9,734,408 B2 *  8/2017  Betley ............... H04N 21/8456
2014/0122606 A1 *  5/2014  Saito .................. G06F 16/5866
                                                        709/204
(Continued)

OTHER PUBLICATIONS

English Translation of Chinese Publication CN111901673 (Year: 2020).*
(Continued)

*Primary Examiner* — Loi H Tran
(74) *Attorney, Agent, or Firm* — Alston & Bird LLP

(57) ABSTRACT

A content summarizing program processes audio and/or visual content of a media item to determine a plurality of segments of the content; and determines a respective ranking for each of the plurality of segments. The respective ranking indicates how representative of the content as a whole the segment is. Based on the plurality of respective rankings and summary time criteria, the content summarizing program selects summary segments from the plurality of segments; and, based on the summary segments, generates a segment transition. The segment transition corresponds to a pair of adjacent summary segments and comprises characteristics of both first and second summary segments of the pair of adjacent summary segments. The content summarizing program stitches together the summary segments using the segment transition to generate a content summary. The summary segments are stitched together with the segment transition disposed between the first summary segment and the second summary segment.

20 Claims, 10 Drawing Sheets

(51) Int. Cl.
*H04N 21/466* (2011.01)
*H04N 21/845* (2011.01)

(58) Field of Classification Search
USPC .......................................................... 386/278
See application file for complete search history.

(56) References Cited

U.S. PATENT DOCUMENTS

| | | | |
|---|---|---|---|
| 2014/0280549 A1* | 9/2014 | Rajan .................... | H04L 67/306 |
| | | | 709/204 |
| 2015/0378544 A1 | 12/2015 | Shahraray et al. | |
| 2016/0179844 A1 | 6/2016 | Shen et al. | |
| 2017/0024614 A1* | 1/2017 | Sanil ....................... | G06F 16/70 |
| 2019/0188479 A1* | 6/2019 | Balasubramanian ... | G06T 7/251 |
| 2019/0377955 A1* | 12/2019 | Swaminathan .. | H04N 21/23418 |
| 2021/0021551 A1 | 1/2021 | Yang et al. | |
| 2021/0048931 A1* | 2/2021 | Barzelay ............ | G06Q 30/0601 |

OTHER PUBLICATIONS

English Translation of Chinese Publication CN112354064 Feb. 2021 (Year: 2021).*
International Search Report and Written Opinion for International Application No. PCT/US2022/034689, dated Sep. 28, 2022, (9 pages), United States Patent and Trademark Office, US.

* cited by examiner

INTELLIGENT AUTOMATED CONTENT SUMMARY GENERATION

CROSS REFERENCE TO RELATED APPLICATIONS

This application is a National Stage Application, filed under 35 U.S.C. § 371, of International Application No. PCT/US2022/034689, filed Jun. 23, 2022, which claims priority to U.S. Application No. 63/202,868, filed Jun. 28, 2021; the content of both of which is are hereby incorporated herein by reference in its their entirety.

FEDERALLY SPONSORED RESEARCH OR DEVELOPMENT

This invention was made with government support under contract number FA9550-15-1-0373 awarded by the Department of Defense. The government has certain rights in the invention.

FIELD

Various embodiments relate generally to the automated generation of content summaries for a media item comprising audio and/or visual content. For example, an example embodiment uses a neural network to generate an intelligent content summary in an automated manner.

BACKGROUND

A consumer may wish to preview various media items to determine which media item(s) the consumer wishes to purchase, license, and/or consume. Thus, a brief preview of the media item may be provided to the consumer for review. However, conventional techniques for generating previews of media items include selecting a random, contiguous portion of the content of the media item (e.g., a thirty second clip), selecting a first portion of the content, or manually generating the preview by a trained human technician. Through applied effort, ingenuity, and innovation many deficiencies of such conventional preview generation for media items comprising audio and/or visual content have been solved by developing solutions that are structured in accordance with the embodiments of the present invention, many examples of which are described in detail herein.

BRIEF SUMMARY OF SOME EXAMPLE EMBODIMENTS

Various embodiments provide methods, apparatuses, computer program products, systems, and/or the like for generating and providing intelligent content summaries of media items comprising audio and/or visual content that provide previews and/or summaries of the respective media items. The content summaries are also referred to as intelligent content summaries herein because a content summary generated in accordance with an embodiment of the present disclosure provides a preview of various portions of the audio and/or visual content of the media item that provides a representation of the media item (e.g., the audio and/or visual content of the media item) as a whole, rather than being a continuous clip selected from the media item (e.g., the first thirty seconds, a random thirty seconds, and/or the like).

In various embodiments, the audio and/or visual content of a media item is segmented into a plurality of segments. A respective rank is determined for each segment of the audio and/or visual content based on ranking criteria such that the rank associated with a segment indicates how representative of the media item and/or the audio and/or visual content of the media item, as a whole, the segment is. Based on the respective ranks of the plurality of segments and possibly other criteria (e.g., summary time criteria), one or more summary segments are selected from the plurality of segments. The content summary is generated by stitching together and/or linking the summary segments using corresponding segment transitions. In various embodiments, the segment transitions are generated to provide a smooth transition between two adjacent summary segments. For example, a segment transition may be characterized by one or more characteristics corresponding to a first summary segment and a second summary segment that are linked and/or stitched together via the segment transition.

In various embodiments, the content summary corresponding to a media item is generated automatically by a content summarizing program. In an example embodiment, the content summarizing program is a program that comprises and/or calls (e.g., via application program interface (API) calls) one or more neural networks and/or deep neural networks (DNNs), such as recurrent neural network (RNN) (e.g., a long short term memory (LSTM) network), a generative adversarial network (GAN), and/or other neural networks (e.g., a ranking network configured to determine respective rankings, and/or the like). For example, in various embodiments, the content summarizing program comprises one or more neural networks, and possibly other program portions, configured to perform various portions of the intelligent content summary generation and/or provision process as described herein. In an example embodiment, the content summarizing program operates in a modular fashion. In an example embodiment, one or more modules of the content summarizing program are associated with a particular genre, type, and/or classification and/or are genre, type and/or classification aware. In various embodiments, the content summarizing program comprises and/or calls various types of neural networks trained to perform various functions of the content summarizing program. For example, in an example embodiment, an LSTM and/or clustering algorithm is used to determine and/or identify the plurality of segments of the audio and/or visual content of the media item. In another example, a GAN is used to generate one or more segment transitions. In another example, a neural network (e.g., a classification network) and/or a clustering algorithm is used to identify and/or determine unique and repeated segments of the plurality of segments and/or to determine respective ranks for the plurality of segments.

According to an aspect of the present invention, an apparatus specially configured to generate and/or provide intelligent content summaries in an automated manner is provided. In an example embodiment, the apparatus comprises at least one processor and at least one memory storing computer executable instructions. The at least one memory and computer executable instructions are configured to, with the processor, cause the apparatus to at least provide a media item comprising audio and/or visual content in a computer-readable format as an input to a content summarizing program. The content summarizing program at least one of (a) comprises at least one neural network or (b) is configured to call at least one neural network. The at least one memory and computer executable instructions are further configured to, with the processor, cause the apparatus to at least operate the content summarizing program to process the audio and/or visual content to determine a plurality of segments of the audio and/or visual content; determine a plurality of respective rankings, each respective ranking corresponding to one segment of the plurality of segments, wherein the respective ranking indicates how representative of the audio and/or visual content as a whole the segment is; based on the plurality of respective rankings and summary time criteria, select summary segments from the plurality of segments; based on the summary segments, generate a segment transition, wherein the segment transition corresponds to a pair of adjacent summary segments and comprises characteristics of both a first summary segment of the pair of adjacent summary segments and a second summary segment of the pair of adjacent summary segments; and stitch together the summary segments using the segment transition to generate a content summary. The summary segments are stitched together such that the segment transition is disposed between the first summary segment and the second summary segment. The at least one memory and computer executable instructions are further configured to, with the processor, cause the apparatus to at least receive the content summary as output from the content summarizing program.

In an example embodiment, the audio and/or visual content has a temporal length and each segment of the plurality of segments corresponds to a respective portion of the temporal length. In an example embodiment, the summary time criteria comprise at least one of (a) a minimum time length of the content summary or (b) a maximum time length of the content summary. In an example embodiment, the at least one memory and computer executable instructions are further configured to, with the processor, cause the apparatus to at least identify one or more unique segments from the from the plurality of segments and two or more repeated segments from the plurality of segments, wherein a repeated segment of the two or more repeated segments is substantially similar to another repeated segment of the two or more repeated segments. In an example embodiment, the first summary segment is not substantially similar to any other of the summary segments. In an example embodiment, the two or more repeated segments comprise (a) a first repeated segment that is substantially similar to a first number of repeated segments of the two or more repeated segments and (b) a second repeated segment that is substantially similar to a second number of repeated segments of the two or more repeated segments, the first repeated segment is not substantially similar to the second repeated segment, the first number is greater than the second number, and the first repeated segment has a higher corresponding respective ranking than the second repeated segment.

In an example embodiment, the content summarizing program comprises a long short term memory network configured to receive the audio and/or visual content at an input layer thereof, process the audio and/or visual content to determine the plurality of segments, and provide information identifying the plurality of segments at an output layer thereof. In an example embodiment, the content summarizing program comprises a generative adversarial network configured to generate the segment transition based on at least a portion of the first summary segment and at least a portion of the second summary segment.

In an example embodiment, the content summarizing program comprises a ranking network configured to determine the plurality of respective rankings based on processing the plurality of segments. In an example embodiment, the ranking network is at least one of (a) configured to receive a genre associated with the audio and/or visual content as input or (b) selected from one or more ranking networks by the content summarizing program based on the genre associated with the audio and/or visual content. In an example embodiment, the genre associated with the audio and/or visual content is determined by (a) analyzing the audio and/or visual content with a genre identification network or (b) reading the genre from meta data associated with the audio and/or visual content. In an example embodiment, the network is at least one of (a) configured to receive user profile information corresponding to an intended audience of the content summary as input or (b) selected from one or more ranking networks by the content summarizing program based on the user profile information corresponding to the intended audience of the content summary. In an example embodiment, the plurality of rankings are determined based at least in part on at least one of (a) a genre of the media item or (b) user profile information of an intended audience of the content summary.

In an example embodiment, the at least one memory and computer executable instructions are further configured to, with the processor, cause the apparatus to perform at least one of (a) storing the content summary in the memory in an audio and/or visual file format, (b) transmitting the content summary such that the content summary is received by at least one of a user computing entity or a system computing entity, or (c) causing a user interface of a computing entity to provide the content summary in a human perceivable format. In an example embodiment, the plurality of segments are determined to include stitching margins, wherein a trailing stitching margin of a first segment of the plurality of segments overlaps at least in part a leading stitching margin of a second segment of the plurality of segments, wherein the second segment follows the first segment in the audio and/or visual content. In an example embodiment, generating the segment transition comprises adjusting one or more characteristics of the trailing stitching margin of the first summary segment and adjusting one or more characteristics of the leading stitching margin of the second summary segment. In an example embodiment, adjusting the one or more characteristics of the trailing stitching margin of the first summary segment comprises synchronizing a beat of the audio and/or visual content within the trailing stitching margin with the beat of the audio and/or visual content in the leading stitching margin and reducing an intensity of the trailing stitching margin while increasing an intensity of the leading stitching margin.

According to another aspect of the present invention, a method for generating and/or providing an intelligent content summary in an automated manner is provided. In an example embodiment, the method comprises providing, by one or more processors, the media item comprising audio and/or visual content in a computer-readable format as an input to a content summarizing program. The content summarizing program at least one of (a) comprises at least one neural network or (b) is configured to call at least one neural network. In an example embodiment, the method further comprises operating, by the one or more processors, the content summarizing program to process the audio and/or visual content to determine a plurality of segments of the audio and/or visual content; determine a plurality of respective rankings, each respective ranking corresponding to one segment of the plurality of segments, wherein the respective ranking indicates how representative of the audio and/or visual content as a whole the segment is; based on the plurality of respective rankings and summary time criteria, select summary segments from the plurality of segments; based on the summary segments, generate a segment transition, wherein the segment transition corresponds to a pair of adjacent summary segments and comprises characteristics of both a first summary segment of the pair of adjacent summary segments and a second summary segment of the pair of adjacent summary segments; and stitch together the summary segments using the segment transition to generate a content summary. The summary segments are stitched together such that the segment transition is disposed between the first summary segment and the second summary segment. The method further comprises receiving, by the one or more processors, the content summary as output from the content summarizing program.

In an example embodiment, the audio and/or visual content has a temporal length and each segment of the plurality of segments corresponds to a respective portion of the temporal length. In an example embodiment, the summary time criteria comprise at least one of (a) a minimum time length of the content summary or (b) a maximum time length of the content summary. In an example embodiment, the method further comprises identifying one or more unique segments from the plurality of segments and two or more repeated segments from the plurality of segments, wherein a repeated segment of the two or more repeated segments is substantially similar to another repeated segment of the two or more repeated segments. In an example embodiment, the first summary segment is not substantially similar to any other of the summary segments. In an example embodiment, the two or more repeated segments comprise (a) a first repeated segment that is substantially similar to a first number of repeated segments of the two or more repeated segments and (b) a second repeated segment that is substantially similar to a second number of repeated segments of the two or more repeated segments, the first repeated segment is not substantially similar to the second repeated segment, the first number is greater than the second number, and the first repeated segment has a higher corresponding respective ranking than the second repeated segment.

In an example embodiment, the content summarizing program comprises a long short term memory network configured to receive the audio and/or visual content at an input layer thereof, process the audio and/or visual content to determine the plurality of segments, and provide information identifying the plurality of segments at an output layer thereof. In an example embodiment, the content summarizing program comprises a generative adversarial network configured to generate the segment transition based on at least a portion of the first summary segment and at least a portion of the second summary segment.

In an example embodiment, the content summarizing program comprises a ranking network configured to determine the plurality of respective rankings based on processing the plurality of segments. In an example embodiment, the ranking network is at least one of (a) configured to receive a genre associated with the audio and/or visual content as input or (b) selected from one or more ranking networks by the content summarizing program based on the genre associated with the audio and/or visual content. In an example embodiment, the genre associated with the audio and/or visual content is determined by (a) analyzing the audio and/or visual content with a genre identification network or (b) reading the genre from meta data associated with the audio and/or visual content. In an example embodiment, the ranking network is at least one of (a) configured to receive user profile information corresponding to an intended audience of the content summary as input or (b) selected from one or more ranking networks by the content summarizing program based on the user profile information corresponding to the intended audience of the content summary. In an example embodiment, the plurality of rankings are determined based at least in part one at least one of (a) a genre of the media item or (b) user profile information of an intended audience of the content summary.

In an example embodiment, the method further comprises at least one of (a) storing the content summary in the memory in an audio and/or visual file format, (b) transmitting the content summary such that the content summary is received by at least one of a user computing entity or a system computing entity, or (c) causing a user interface of a computing entity to provide the content summary in a human perceivable format. In an example embodiment, the plurality of segments are determined to include stitching margins, wherein a trailing stitching margin of a first segment of the plurality of segments overlaps at least in part a leading stitching margin of a second segment of the plurality of segments, wherein the second segment follows the first segment in the audio and/or visual content. In an example embodiment, generating the segment transition comprises adjusting one or more characteristics of the trailing stitching margin of the first summary segment and adjusting one or more characteristics of the leading stitching margin of the second summary segment. In an example embodiment, adjusting the one or more characteristics of the trailing stitching margin of the first summary segment comprises synchronizing a beat of the audio and/or visual content within the trailing stitching margin with the beat of the audio and/or visual content in the leading stitching margin and reducing an intensity of the trailing stitching margin while increasing an intensity of the leading stitching margin.

According to still another aspect, a computer program product is provided. In an example embodiment, the computer program product comprises at least one non-transitory computer-readable storage medium having computer-executable instructions stored therein. The computer-executable instructions portions comprise computer program code instructions corresponding to a content summarizing program. The computer program code instructions, when executed by a processor of a summarizing computing entity, are configured to provide a media item comprising audio and/or visual content in a computer-readable format as an input to the content summarizing program. The content summarizing program at least one of (a) comprising at least one neural network or (b) configured to call at least one neural network. The computer program code instructions, when executed by a processor of a summarizing computing entity, are further configured to operate the content summarizing program to process the audio and/or visual content to determine a plurality of segments of the audio and/or visual content; determine a plurality of respective rankings, each respective ranking corresponding to one segment of the plurality of segments, wherein the respective ranking indicates how representative of the content as a whole the segment is; based on the plurality of respective rankings and summary time criteria, select summary segments from the plurality of segments; based on the summary segments, generate a segment transition, wherein the segment transition corresponds to a pair of adjacent summary segments and comprises characteristics of both a first summary segment of the pair of adjacent summary segments and a second summary segment of the pair of adjacent summary segments; and stitch together the summary segments using the segment transition to generate a content summary. The summary segments are stitched together such that the segment transition is disposed between the first summary segment and the second summary segment. The computer program code instructions, when executed by a processor of a summarizing computing entity, are further configured to receive the content summary as output from the content summarizing program.

In an example embodiment, the audio and/or visual content has a temporal length and each segment of the plurality of segments corresponds to a respective portion of the temporal length. In an example embodiment, the summary time criteria comprise at least one of (a) a minimum time length of the content summary or (b) a maximum time length of the content summary. In an example embodiment, the computer program code instructions, when executed by a processor of a summarizing computing entity, are further configured to identify one or more unique segments from the from the plurality of segments and two or more repeated segments from the plurality of segments, wherein a repeated segment of the two or more repeated segments is substantially similar to another repeated segment of the two or more repeated segments. In an example embodiment, the first summary segment is not substantially similar to any other of the summary segments. In an example embodiment, the two or more repeated segments comprises (a) a first repeated segment that is substantially similar to a first number of repeated segments of the two or more repeated segments and (b) a second repeated segment that is substantially similar to a second number of repeated segments of the two or more repeated segments, the first repeated segment is not substantially similar to the second repeated segment, the first number is greater than the second number, and the first repeated segment has a higher corresponding respective ranking than the second repeated segment.

In an example embodiment, the content summarizing program comprises a long short term memory network configured to receive the audio and/or visual content at an input layer thereof, process the audio and/or visual content to determine the plurality of segments, and provide information identifying the plurality of segments at an output layer thereof. In an example embodiment, the content summarizing program comprises a generative adversarial network configured to generate the segment transition based on at least a portion of the first summary segment and at least a portion of the second summary segment.

In an example embodiment, the content summarizing program comprises a ranking network configured to determine the plurality of respective rankings based on processing the plurality of segments. In an example embodiment, one of (a) the ranking network is configured to receive a genre associated with the audio and/or visual content as input or (b) is selected from one or more ranking networks by the content summarizing program based on the genre associated with the audio and/or visual content. In an example embodiment, the genre associated with the audio and/or visual content is determined by (a) analyzing the audio and/or visual content with a genre identification network or (b) reading the genre from meta data associated with the audio and/or visual content. In an example embodiment, one of (a) the ranking network is configured to receive user profile information corresponding to an intended audience of the content summary as input or (b) is selected from one or more ranking networks by the content summarizing program based on the user profile information corresponding to the intended audience of the content summary. In an example embodiment, the plurality of rankings are determined based at least in part one at least one of (a) a genre of the media item or (b) user profile information of an intended audience of the content summary.

In an example embodiment, the computer program code instructions, when executed by a processor of a summarizing computing entity, are further configured to cause one of (a) store the content summary in the memory in an audio and/or visual file format, (b) transmit the content summary such that the content summary is received by at least one of a user computing entity or a system computing entity, or (c) cause a user interface of a computing entity to provide the content summary in a human perceivable format. In an example embodiment, the plurality of segments are determined to include stitching margins, wherein a trailing stitching margin of a first segment of the plurality of segments overlaps at least in part a leading stitching margin of a second segment of the plurality of segments, wherein the second segment follows the first segment in the audio and/or visual content. In an example embodiment, generating the segment transition comprises adjusting one or more characteristics of the trailing stitching margin of the first summary segment and adjusting one or more characteristics of the leading stitching margin of the second summary segment. In an example embodiment, adjusting the one or more characteristics of the trailing stitching margin of the first summary segment comprises synchronizing a beat of the audio and/or visual content within the trailing stitching margin with the beat of the audio and/or visual content in the leading stitching margin and reducing an intensity of the trailing stitching margin while increasing an intensity of the leading stitching margin.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 4:
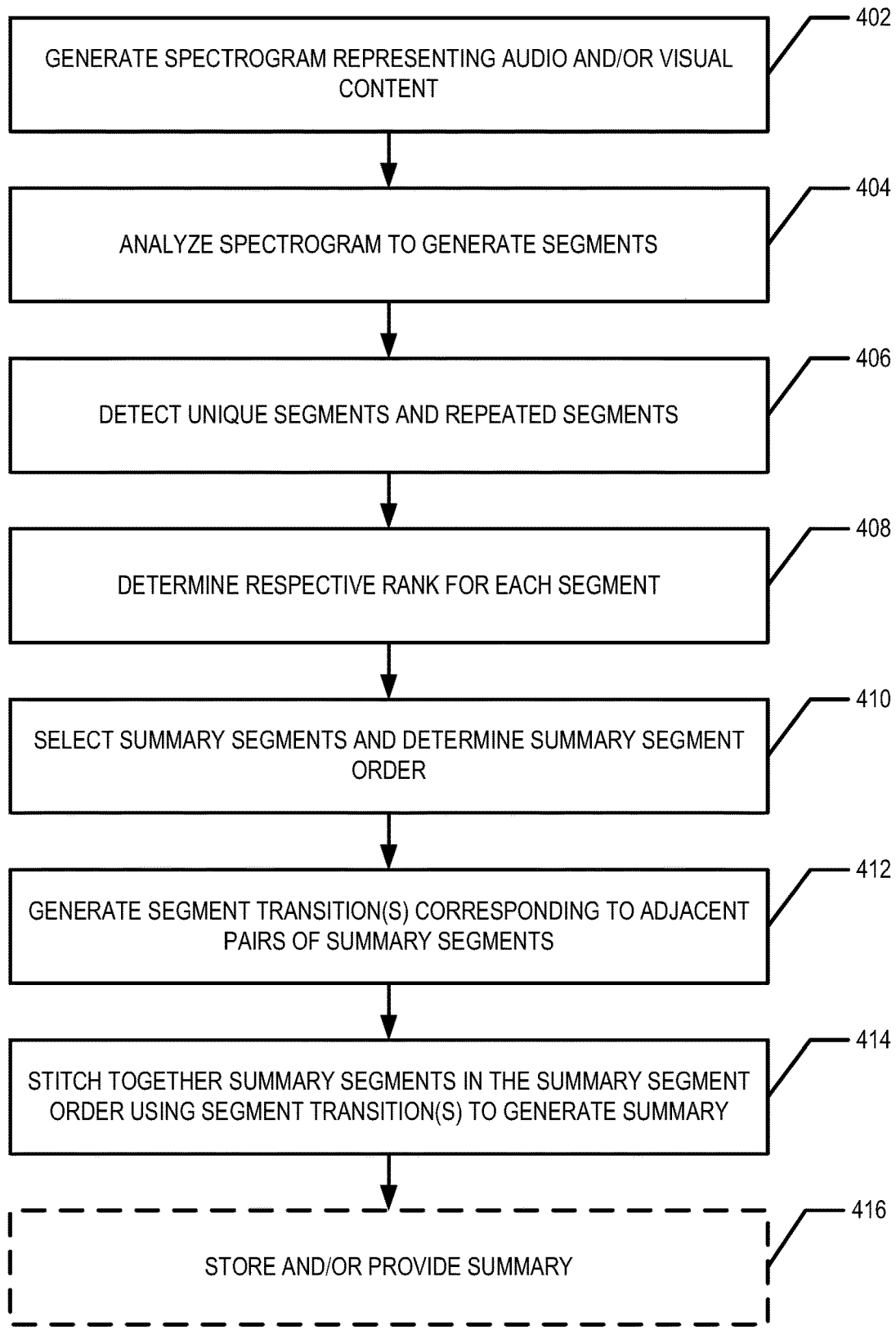
Figure 5:
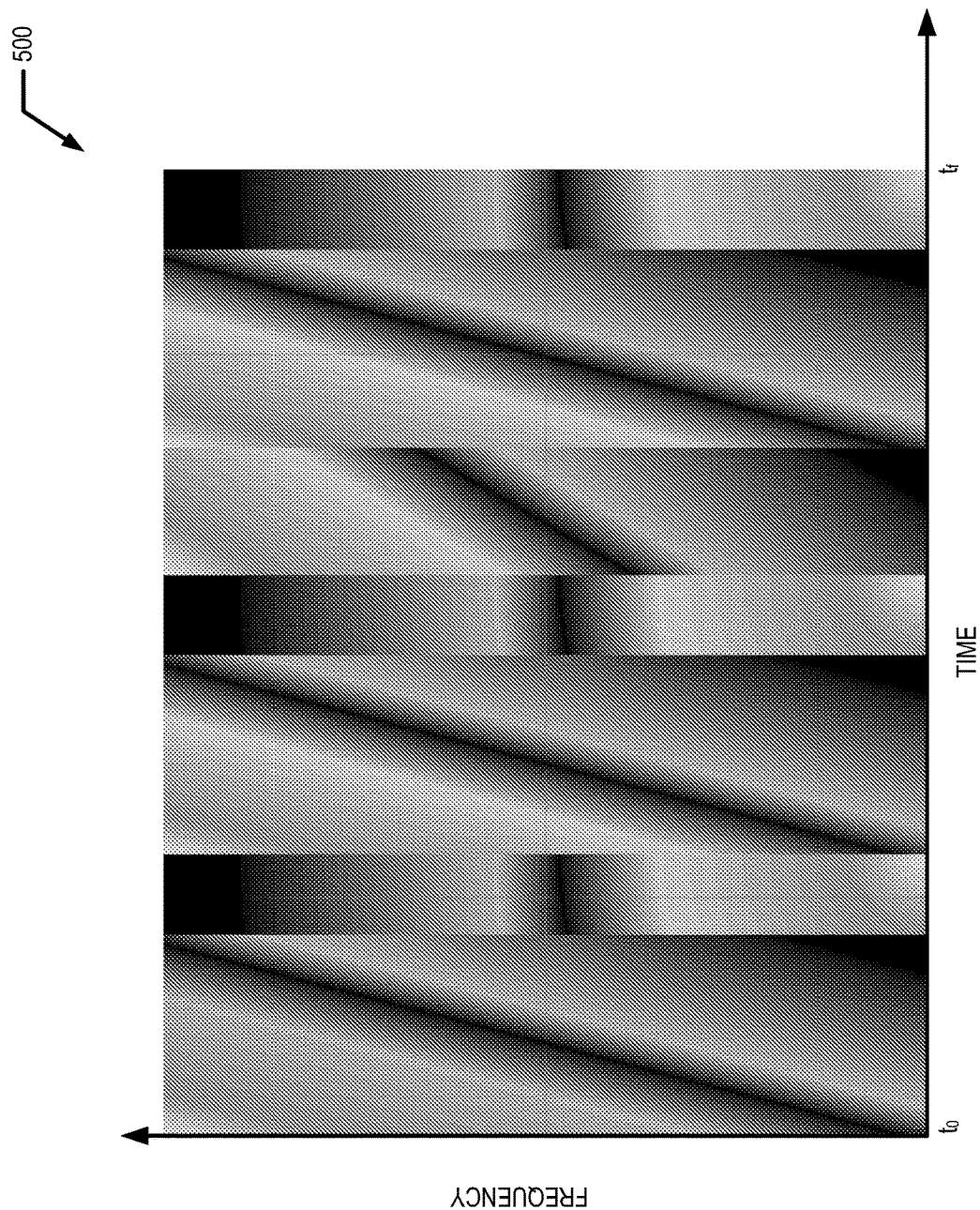
Figure 6A:
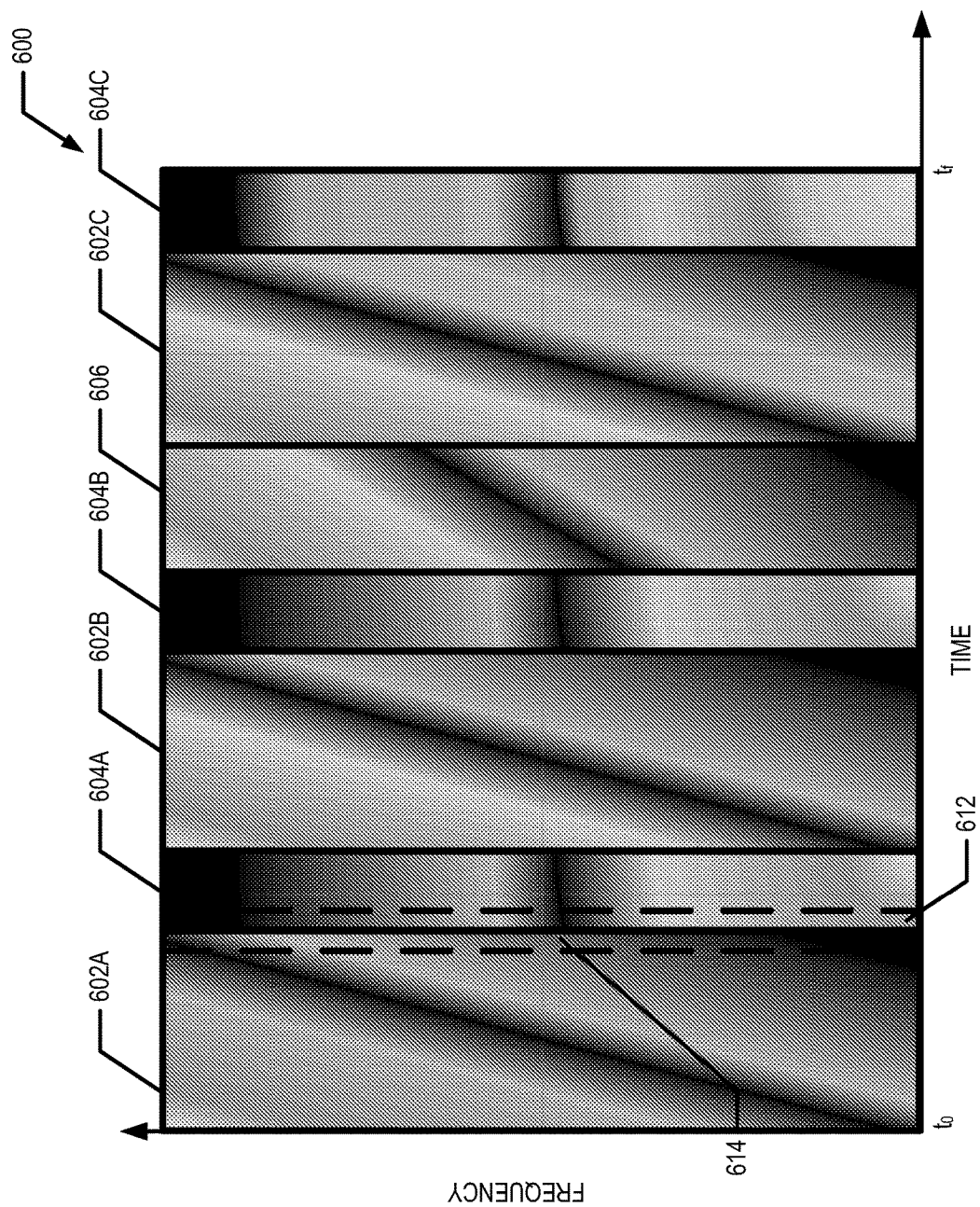
Figure 6B:
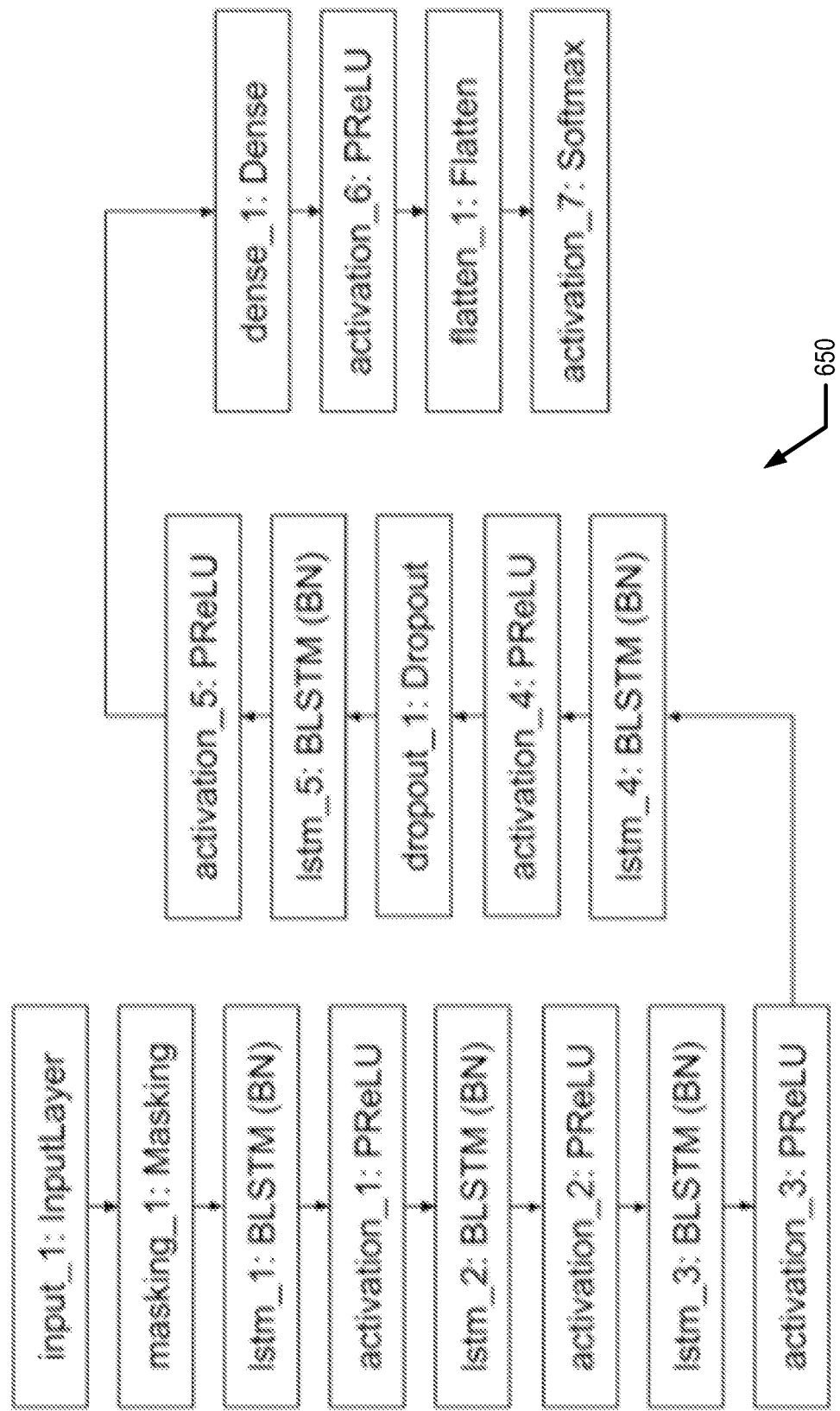
Figure 7:
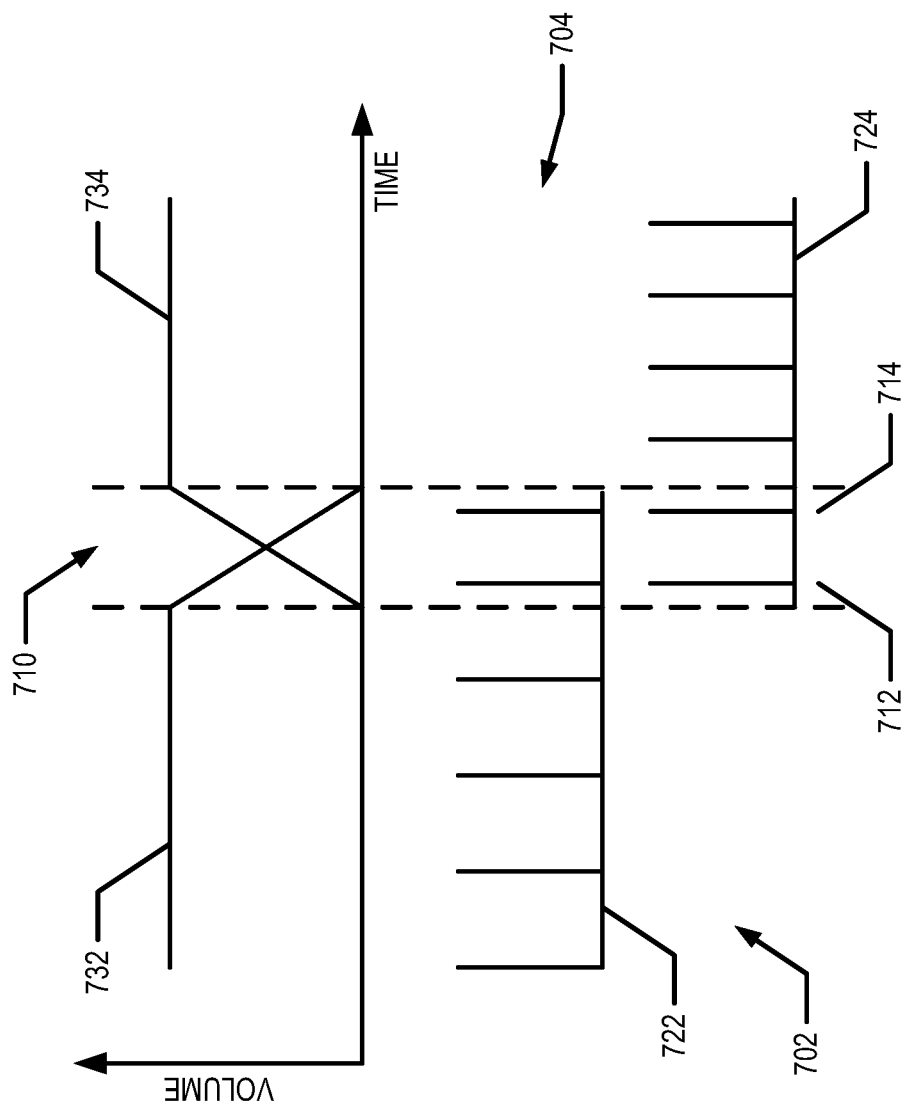
Figure 8:
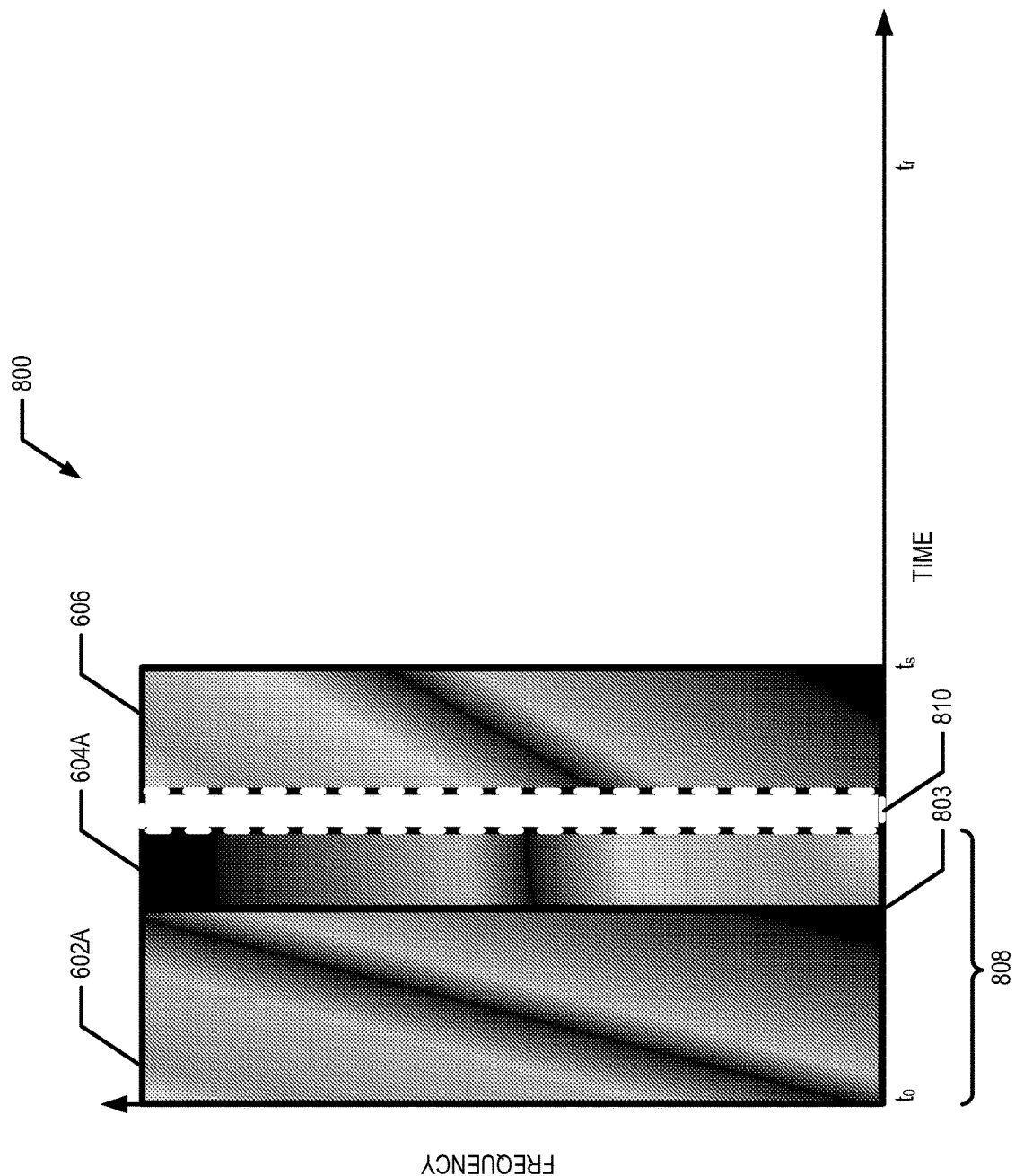
Figure 9:
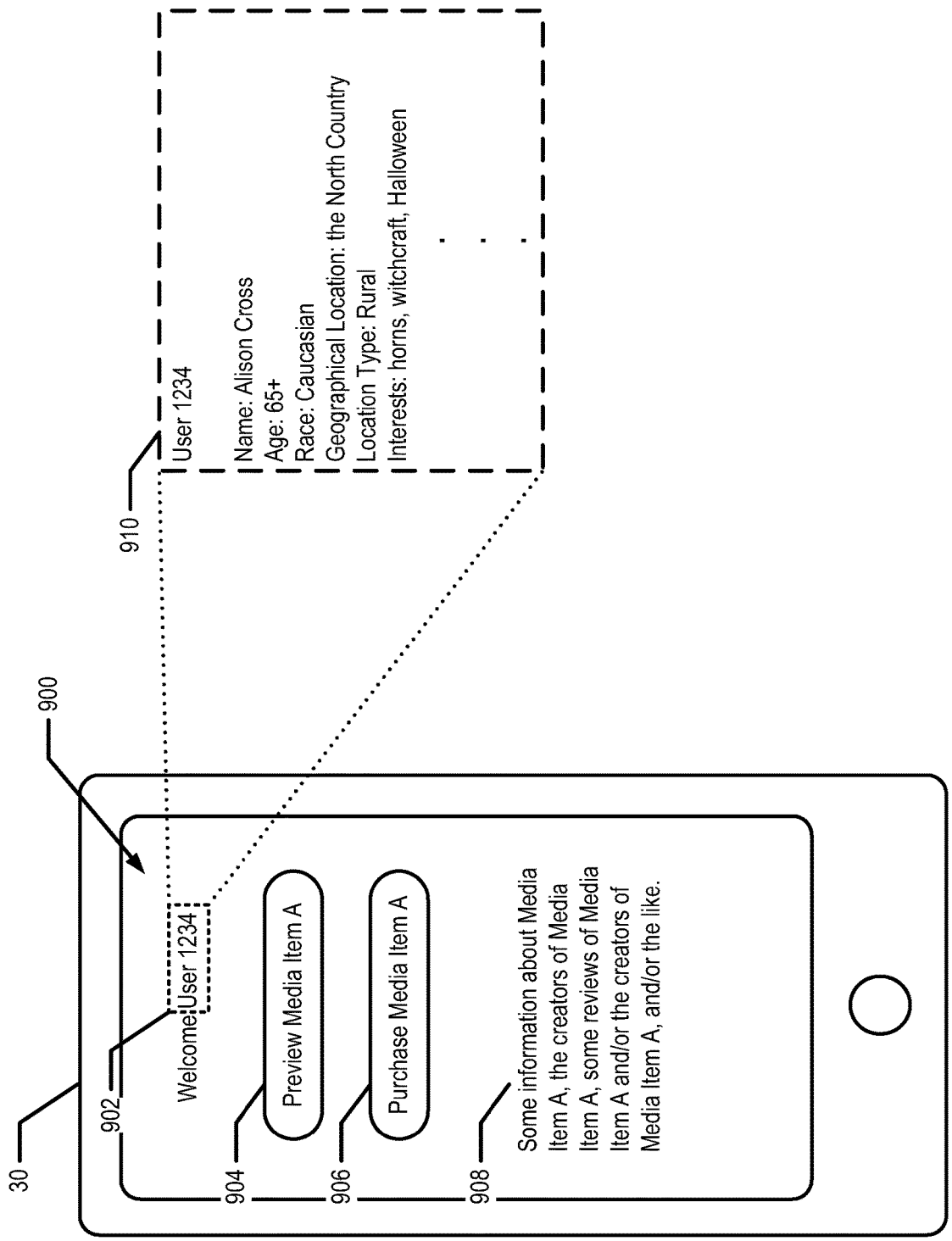

FIG. 4 provides a flowchart illustrating processes, procedures, and/or operations performed, for example, by a summarizing computing entity, for automatically generating and/or providing an intelligent content summary, in accordance with an example embodiment;

FIG. 5 provides an example spectrogram of the audio and/or visual content of an example media item, in accordance with an example embodiment;

FIG. 6A illustrates the example spectrogram shown in FIG. 5 with the determined plurality of segments shown, in accordance with an example embodiment;

FIG. 6B illustrates an example architecture of a long short term memory (LSTM) network configured to determine the plurality of segments of the audio and/or visual content, in accordance with an example embodiment;

FIG. 7 illustrates the generation of an example segment transition, in accordance with an example embodiment;

FIG. 8 illustrates an example spectrogram of an example content summary for the audio and/or visual content of the example media item corresponding to the example spectrograms shown in FIGS. 5 and 6A and generated in accordance with an example embodiment; and FIG. 9 provides an example view of a graphical user interface used to access a content summary, in accordance with an example embodiment.

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. GENERAL OVERVIEW

In various scenarios, a user may wish to purchase, license, and/or consume media items. However, the large number of media items available for purchase, license, and/or consumption may make the decision as to which media item(s) to purchase, license, and/or consume difficult. In order to aid the user in making such decisions, an owner and/or distributor of media items may provide access to previews of respective media items via a website, application, and/or the like. A user may access the website, application, and/or the like and access and/or consume one or more previews. Based on the user's impression of a media item based on the corresponding preview the user may decide to purchase and/or license the media item from the owner and/or distributor (e.g., possibly via the website, application, and/or the like).

Conventionally, these previews are short clips of the respective media items (e.g., a continuous thirty second snippet). However, such a preview is not generally representative of the media item as a whole. For example, a randomly selected thirty seconds of a song may not include portions of the song that are musically significant. Thus, when the user decides whether to purchase, license, and/or consume the media item based on the preview, the user's decision may not be well-informed. Conventionally, creation of previews that are representative of respective media items as whole requires a significant amount of work by a trained human technician. For example, the human technician must identify sections of the media item to include in the preview, define the sections, and then combine the sections to generate the preview. Thus, generating a preview for a single song may require hours of the human technicians time. Therefore, the creation of previews that representative of respective media items is not tenable for a medium or large catalog of media items (e.g., a catalog including tens, hundreds, thousands, or millions of media items). As such, technical problems exist as to how to generate previews of media items that are representative of the respective media items as a whole without requiring a significant amount of human technician time.

Various embodiments provide technical solutions to these technical problems. In particular, various embodiments provide methods, apparatuses, computer program products, systems, and/or the like for automatically generating and providing intelligent content summaries of media items and/or audio and/or visual content of the media items that provide previews of the respective media items. The content summaries are referred to as intelligent content summaries herein because the summaries provide a preview of various portions of the audio and/or visual content of a corresponding media item that provide a representation of the audio and/or visual content and/or the corresponding media item as a whole, rather than being a continuous clip selected from the audio and/or visual content. In various embodiments, the intelligent content summaries are generated in an automated manner.

In various embodiments, audio and/or visual content of the media item is provided to a content summarizing program that, responsive to receiving the audio and/or visual content, generates and outputs an intelligent content summary the represents the audio and/or visual content and/or the corresponding media item. In various embodiments, the content summarizing program is a program that comprises and/or is in communication with (e.g., via API calls and/or the like) one or more neural networks. In various embodiments, the content summarizing program is configured to identify, determine, and/or define a plurality of segments of the audio and/or visual content. The content summarizing program is further configured to determine respective rankings for the segments such that the respective rankings indicate how representative of the audio and/or visual content of the media item each of the segments is. The content summarizing program is further configured to, based at least in part on the respective rankings, one or more summary segments are selected from the plurality of segments. The content summarizing program is further configured to generate segment transitions for use in stitching together the summary segments in a cohesive and/or smooth manner. The content summarizing program is further configured to generate a content summary by stitching together the summary segments using the generated segment transitions and provide the content summary. The content summary may then be stored for later use, provided for user consumption, provided for inclusion in a catalog or library of content summaries and/or media items (e.g., possibly in association with the corresponding media item), and/or the like.

Various embodiments therefore provide intelligent content summaries that are representative of a corresponding media item as a whole in an automated manner. The intelligent content summaries may then be made accessible for user consumption via a website, application, and/or other user interface (e.g., graphical user interface). As the intelligent content summaries provide a representation of the audio and/or visual content of a media item as a whole by stitching together segments of the audio and/or visual content is a cohesive manner, the intelligent content summaries generated in accordance with various embodiments provide an improved user experience of websites, applications, and/or other user interfaces (e.g., graphical user interfaces) that provide previews of media items. As such, various embodiments provide technical advantages over conventional techniques for generating previews of media items.

II. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. EXAMPLE SYSTEM ARCHITECTURE

Figure 1:
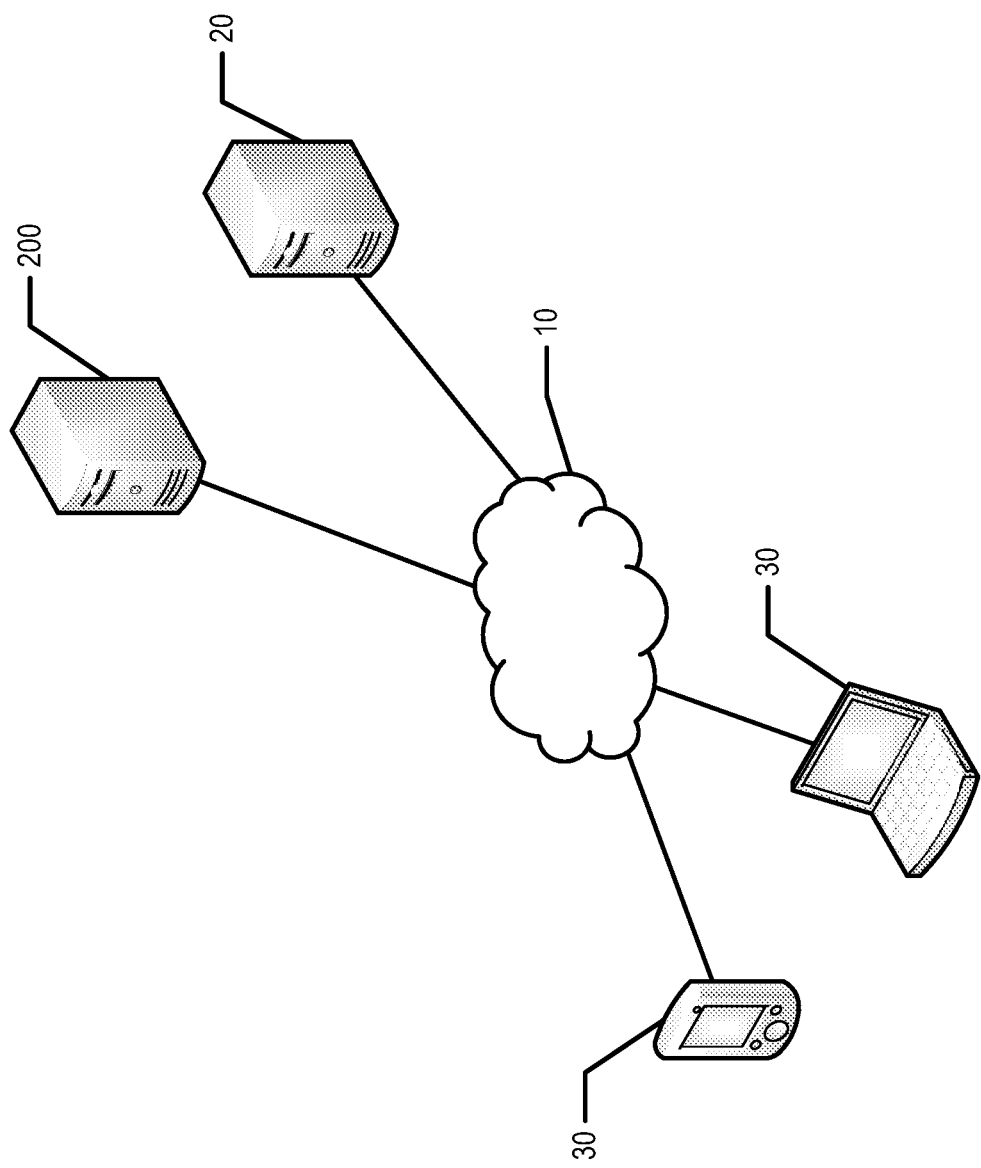
FIG. 1 is a diagram of a system that can be used to practice various embodiments.

FIG. 1 provides an illustration of a system that can be used in conjunction with various embodiments of the present invention. As shown in FIG. 1, the system may comprise a one or more system computing entities 20, one or more summarizing computing entities 200, one or more user computing entities 30, one or more networks 10, and/or the like. Each of the components of the system may be in electronic communication with, for example, one another over the same or different wireless or wired networks 10 including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture. For example, in an example embodiment, the summarizing computing entity 200 is a portion of a system computing entity 20.

a. Example Summarizing Computing Entity

In various embodiments, a summarizing computing entity 200 is configured to generate intelligent content summaries for respective media items. The summarizing computing entity 200 receives the media item from a respective system computing entity 20 and generates the content summary. The summarizing computing entity 200 may store the content summary to memory, provide (e.g., transmit) the content summary to one or more system computing entities 20 and/or user computing entities 30, provide the content summary via a user interface for user review and/or consumption, and/or the like. In various embodiments, the summarizing computing entity 200 stores and/or executes computer program code and/or computer executable instructions corresponding to a content summarizing program. In various embodiments, the content summarizing program is a program that comprises and/or calls (e.g., via API calls and/or the like) one or more neural networks. In various embodiments, the summarizing computing entity 200 may comprise and/or be configured to operate and/or execute the one or more neural networks. In an example embodiment, the summarizing computing entity 200 is configured to train one or more neural networks for use by and/or configured to be called by the content summarizing program. In an example embodiment, the summarizing computing entity 200 is configured to generate intelligent content summaries in a just-in-time manner (e.g., in real time or near real time with respect to receiving the media item and/or a request for the intelligent content summary to be provided).

Figure 2:
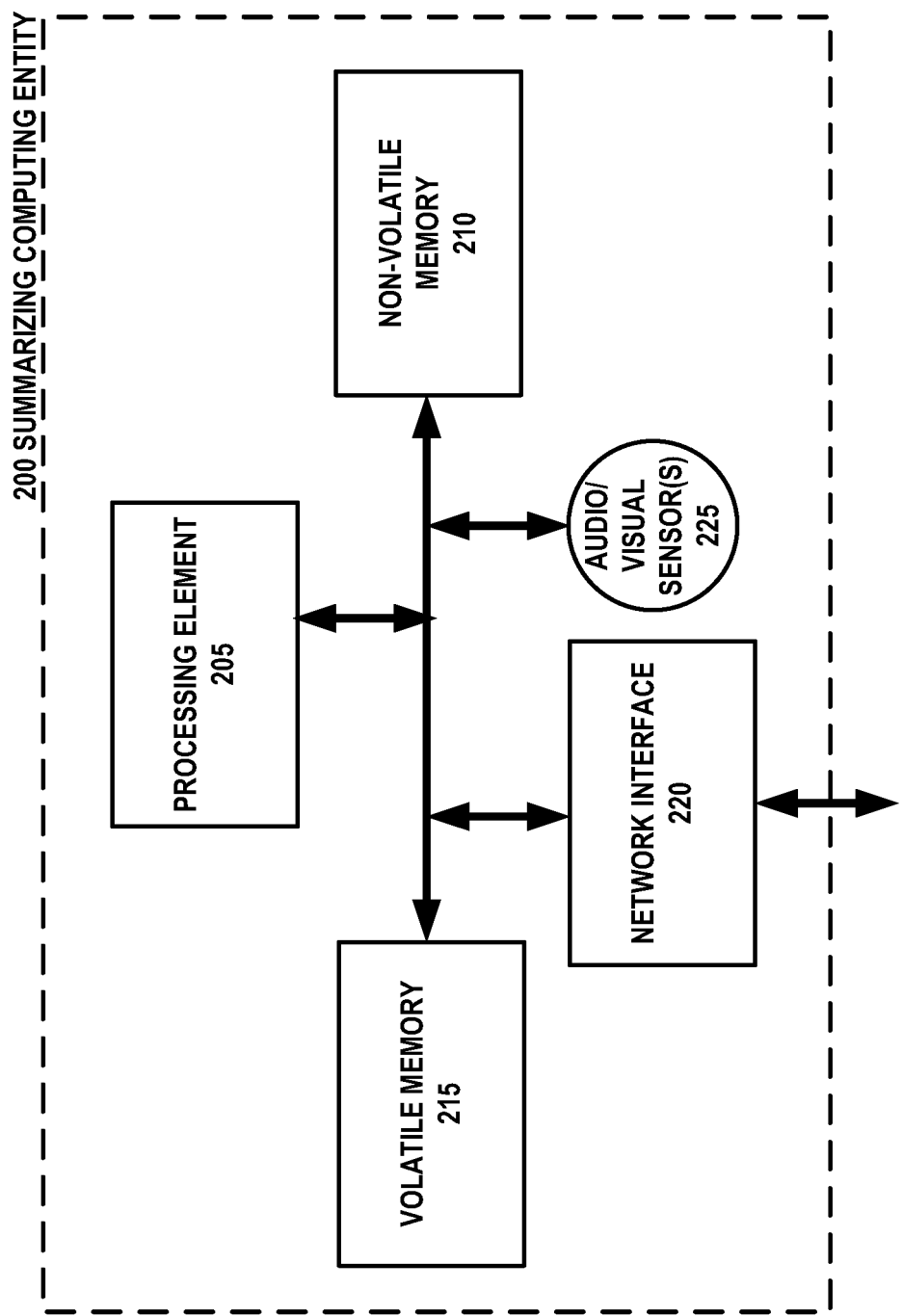
FIG. 2 is a schematic of a summarizing computing entity, in accordance with various embodiments.

FIG. 2 provides a schematic of a summarizing computing entity 200 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, television set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, selecting, identifying, and/or similar terms used herein interchangeably. In one embodiment, these functions, operations, and/or processes can be performed on data, content, information, and/or similar terms used herein interchangeably.

As shown in FIG. 2, in one embodiment, the summarizing computing entity 200 may include or be in communication with one or more processing elements 205 (also referred to as processors, processing circuitry, and/or similar terms used herein interchangeably) that communicate with other elements within the summarizing computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly. For example, the processing element 205 is configured to execute and/or operate a content summarizing program (e.g., a program comprising and/or in communication with one or more neural networks), in various embodiments.

In one embodiment, the summarizing computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database. For example, the non-volatile memory 210 may store computer executable instructions that correspond to the content summarizing program that, when executed by the processing element 205, cause the summarizing computing entity 200 to execute and/or operate the content summarizing program. In an example embodiment, the non-volatile memory 210 further stores weights and/or parameters corresponding to one or more neural networks that are part of and/or may be called by the content summarizing program.

In one embodiment, the summarizing computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 205. Thus, the databases, database instances, database management system entities, data, applications, programs, program modules, scripts, source code, object code, byte code, compiled code, interpreted code, machine code, executable instructions, and/or the like may be used to control certain aspects of the operation of the summarizing computing entity 200 with the assistance of the processing element 205 and operating system.

As indicated, in one embodiment, the summarizing computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the summarizing computing entity 200 may communicate with other summarizing computing entities 200, one or more system computing entities 20, one or more user computing entities 30, and/or the like.

Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In various embodiments, the summarizing computing entity 200 further comprises one or more user interface elements. For example, the summarizing computing entity 200 may comprise and/or be in communication with a display, speakers, and/or other output devices for providing human perceivable output, in various embodiments. In another example, the summarizing computing entity 200 may comprise and/or be in communication with a keyboard, mouse, touchscreen and/or touch sensor, audio/visual sensor(s) 225 (e.g., microphone, camera, and/or the like), and/or other input devices for receiving human user input.

As will be appreciated, one or more of the summarizing computing entity's 200 components may be located remotely from other summarizing computing entity 200 components, such as in a distributed system. Furthermore, one or more of the components may be combined and additional components performing functions described herein may be included in the summarizing computing entity 200. Thus, the summarizing computing entity 200 can be adapted to accommodate a variety of needs and circumstances.

In example embodiments, the summarizing computing entity 200 may be in communication with one or more other summarizing computing entities 200, one or more system computing entities 20, and/or one or more user computing entities 30.

b. Example System Computing Entity

In various embodiments, a system computing entity 20 is owned and/or operated on behalf of an owner, licenser, distributor, marketer, and/or the like of media items. The system computing entity 20 may provide (e.g., transmit) the media item such that a summarizing computing entity 200 receives the media item and returns an intelligent content summary to the system computing entity 20 (and/or to one or more user computing entities 30). The system computing entity 20 may store the content summary and/or may provide (e.g., distribute) the content summary (e.g., via a website, application, and/or the like). For example, the system computing entity 20 may transmit the content summary (possibly in response to receiving/processing a request therefor) to one or more user computing entities 30 such that the user computing entities 30 may provide the content summary via a user interface thereof for human user review and/or consumption.

Figure 3:
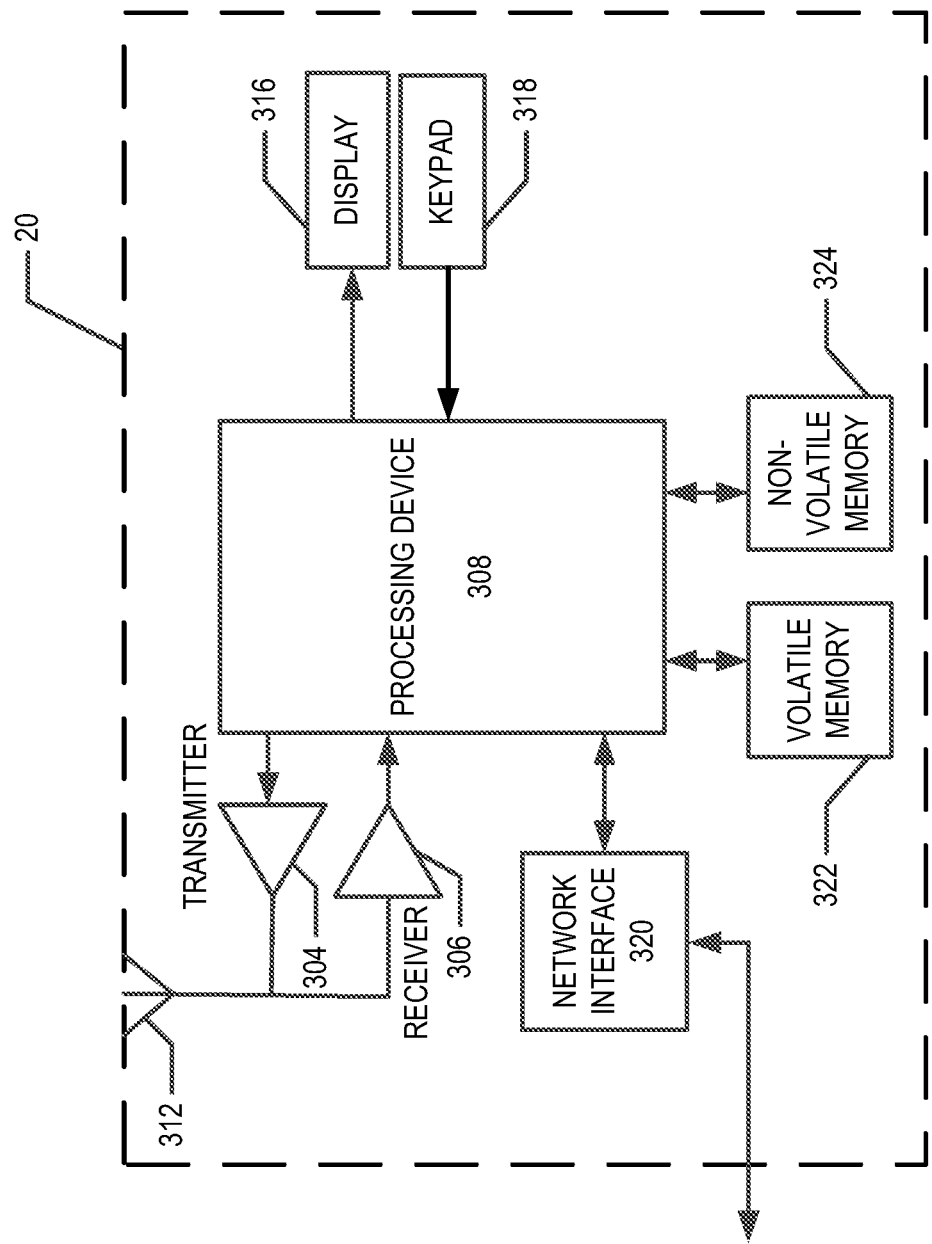
FIG. 3 is a schematic of a user computing entity or a system computing entity, in accordance with various embodiments.

In various embodiments, a system computing entity 20 is a server, server farm, data center, cloud-based processing and/or storage service, desktop computer, laptop, and/or other computing entity and/or device. FIG. 3 provides an illustrative schematic representative of a system computing entity 20 that can be used in conjunction with embodiments of the present invention. As shown in FIG. 3, a system computing entity 20 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a summarizing computing entity 200, one or more user computing entities 30, another system computing entity 20, and/or the like. In this regard, the system computing entity 20 may be capable of operating with one or more air interface standards, communication protocols, modulation types, and access types. More particularly, the system computing entity 20 may operate in accordance with any of a number of wireless communication standards and protocols. In a particular embodiment, the system computing device 20 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the system computing entity 20 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The system computing entity 20 can also download changes, add-ons, and updates, for instance, to its firmware, software (e.g., including executable instructions, applications, program modules), and operating system.

According to one embodiment, the system computing entity 20 may include location determining aspects, devices, modules, functionalities, and/or similar words used herein interchangeably. For example, the system computing entity 20 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the system computing entity's 20 position in connection with a variety of other systems, including cellular towers, Wi-Fi access points, and/or the like. Similarly, the system computing entity 20 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The system computing entity 20 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the system computing entity 20 to cause display or audible presentation of information/data, audio and/or visual content, an intelligent content summary, and for user interaction therewith via one or more user input interfaces. The user input interface can comprise any of a number of devices allowing the system computing entity 20 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the system computing entity 20 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the system computing entity 20 can collect information/data, user interaction/input, and/or the like.

The system computing entity 20 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the system computing entity 20.

In example embodiments, the system computing entity 20 may be in communication with one or more other system computing entities 20, one or more summarizing computing entities 200, and/or one or more user computing entities 30.

c. Example User Computing Entity

In an example embodiment, a user computing entity 30 may be a computing entity configured for user interaction (e.g., via one or more user interface devices thereof). For example, a user may operate the user computing entity 30 (e.g., via a user interface thereof) to access a website, application, and/or other graphical user interface to request a content summary for a particular media item. For example, the website, application, and/or graphical user interface may provide the user with access to a catalog of media items and the user may select (e.g., via interaction with the user interface) one or more media items to preview. The user computing entity 30, responsive to receiving user input indicating a selection of a media item the user would like to preview, accesses and/or requests an intelligent content summary corresponding to the user-selected media item (e.g., from a system computing entity 20 and/or summarizing computing entity 200). The user computing entity 30 receives the intelligent content summary and provides the content summary via the user interface (e.g., speakers and/or display) for consumption by the user. In various embodiments, a user may be a person or human interacting with a user computing entity 30 (e.g., via the user interface devices thereof). In an example embodiment, a user is a machine user (e.g., an artificial intelligence application and/or the like) operating on the user computing entity 30.

In various embodiments, a user computing entity 30 is a mobile and/or smart phone, tablet, laptop, desktop computer, television set-top box, client device, and/or other computing entity and/or device. In various embodiments, a user computing entity 30 comprises components and/or elements similar to those of the summarizing computing entity 200 and/or system computing entity 30. For example, in various embodiments, the user computing entity 30 may comprise components and/or elements similar to those illustrated in FIG. 3. For example, as shown in FIG. 3, in an example embodiment, a user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a summarizing computing entity 200, one or more system computing entities 20, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing device 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the system computing entity's 20 position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data, audio and/or visual content, an intelligent content summary, and for user interaction therewith via one or more user input interfaces. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

In example embodiments, the user computing entity 30 may be in communication with one or more other user computing entities 30, one or more summarizing computing entities 200, and/or one or more system computing entities 20.

d. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANS, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

IV. EXAMPLE SYSTEM OPERATION

Various embodiments generate and/or provide intelligent content summaries of media items and/or audio and/or visual content of the media items. The intelligent content summaries provide previews of the respective media items. The content summaries are referred to as intelligent content summaries herein because the summaries provide a preview of various portions of the audio and/or visual content of a corresponding media item that provide a representation of the audio and/or visual content and/or the corresponding media item as a whole, rather than being an indiscriminately selected continuous clip selected from the audio and/or visual content. In various embodiments, the intelligent content summaries are generated in an automated manner. For example, audio and/or visual content of the media item is provided to a content summarizing program that, responsive to receiving the audio and/or visual content, generates and outputs an intelligent content summary the represents the audio and/or visual content and/or the corresponding media item.

The media item comprises audio and/or visual content that evolves with time. For example, the audio and/or visual content may have a run and/or play time T which extends from a starting time $t_0$ to a final time $t_f$ (e.g., $T=t_f-t_0$). In an example embodiment, the audio and/or visual content comprises one or more sound frequencies that change in intensity and/or volume over the duration of the run and/or play time T. In an example embodiment, the audio and/or visual content comprises an array of visual frequencies (e.g., a spatially distributed array of colors defined over a particular surface or volume) that change in position and/or intensity/brightness over the duration of the run and/or play time T. In an example embodiment, the audio and/or visual content defines an audible and/or visual beat and/or timing/rhythm signature that may or may not change and/or evolve over the duration of the duration of the run and/or play time. In various embodiments, the media item is a song, a piece of music, suite of musical works, an audio book, a music video, a video, a movie (e.g., a full length movie, a short, a silent film, in color or in black and white/greyscale), and/or other audio and/or visual work. In various embodiments, the run time of the intelligent content summary is determined based on the type and/or classification of the media item, user preferences determined based on user input and/or consumer demographics, and/or the like. In an example embodiment, the media item is the audio of a song and the intelligent content summary is a preview of the song that is substantially 20-35 seconds long (e.g., 30 seconds long).

In various embodiments, the media item further comprises metadata. In various embodiments, the metadata comprises an indication of a genre, type, and/or classification of the audio and/or visual content of the media item. In various embodiments, the classification indicates a class of audio and/or visual work that describes the audio and/or visual content (e.g., song, music video, full length movie, short movie, audio book). In various embodiments, the type indicates whether the audio and/or visual content includes audio content and/or includes visual content (e.g., the audio and/or visual content consist of audio content, consists of visual content, includes both audio and visual content). In various embodiments, the genre indicates a genre of the audio and/or visual content that is appropriate for the class of audio and/or visual content. For example, if the audio and/or visual content is classified as a song, the genre may be rock and roll, country western, pop, electronic dance music (EDM), and/or the like. For example, if the audio and/or visual content is a movie, the genre may be documentary, intellectual thriller, comedy, romantic comedy, drama, kids, and/or the like. In various embodiments, the metadata comprises an indication of a title of the audio and/or visual content, creator(s) of the audio and/or visual content (e.g., producer, director, songwriter, singers, musicians, actor(s), animators, and/or other creators of the audio and/or visual content), copyright holder for the audio and/or visual content, run and/or play time T, and/or other information relating to the media item.

In various embodiments, the audio and/or visual content of the media item is segmented into a plurality of segments. Each segment is a temporal section of the audio and/or visual content. For example, each segment i has a respective start time $s_{i0}$ and an end time $s_{if}$, such that $t_0 \leq s_{i0} < s_{if} \leq s_{(i+1)0} < s_{(i+1)f} \leq t_f$. Each segment i has a respective segment run and/or play time $S_i = s_{if} - s_{i0} < T$. The plurality of segments are defined such that each segment is cohesive section of the audio and/or visual content. In the example where the audio and/or visual content of the media item is a song, in an example embodiment, the segments are individual verses or individual stanzas of the verses, individual instances of the chorus and/or refrain, intro, outro, bridge, musical interlude and/or instrumental bridge, instrumental solo, and/or the like. For example, the plurality of segments identified, determined, and/or defined for a song that includes three verses, three instances of the chorus, a bridge, and a guitar solo, in an example embodiment, include a segment for each of the three verses, a segment for each of the three instances of chorus, a segment for the bridge, and a segment for the guitar solo.

A respective rank is determined for each segment of the audio and/or visual content based on ranking criteria such that the rank associated with a segment indicates how representative of the audio and/or visual content as a whole the segment is. In various embodiments, a neural network (e.g., a classifier and/or the like) is configured to analyze the plurality of segments and determine the respective rankings. Various other ranking models are used in various embodiments. In an example embodiment, the rankings are determined based on identified repeated themes (e.g., words, musical phrases, melody lines, audio and/or visual patterns, and/or the like), the recurrence frequency and/or number of occurrences of a theme, and/or the like. For example, in the example described above where the audio and/or visual content of the media item is a song including three instances of the chorus, a bridge, and a guitar solo, a segment corresponding to the chorus may be determined to have a higher ranking than the segment corresponding to the bridge since the chorus is repeated multiple times in the song, and thus the chorus is more representative of the audio and/or visual content as a whole compared to the bridge.

In various embodiments, it may be desired to not include three segments corresponding to the chorus in the content summary. For example, while the chorus of a song may be representative of the song, a content summary that is merely three instances of the chorus may not be representative of the song as a whole. Thus, in various embodiments, unique and repeated segments are identified. A repeated segment is a segment that is substantially similar to another repeated segment. As used herein, two segments are substantially similar to one another when they correspond to different instances of the same portion of the audio and/or visual content. For example, in the example where the audio and/or visual content is a song that includes three instances of the chorus and one instance of the guitar solo, the three segments that correspond to the respective instances of the chorus are identified as repeated segments and the segment corresponding to the guitar solo is identified as a unique segment. For example, the instrumentation, backing vocals, and/or emotive delivery of the lyrics may differ between two instances of the chorus, but the lyrics, melody, and beat and/or timing/rhythm signature of the chorus may remain the same such that the two instances of the chorus are determined to be substantially similar. In an example embodiment, the repeated segments may be grouped such that each repeated segment in a group of repeated segments is substantially similar to each of the other repeated segments in the group of repeated segments (e.g., each repeated segment in a particular group of repeated segments is a segment that corresponds to the chorus). In an example embodiment, a ranking is determined for only one representative segment of each group of repeated segments. In an example embodiment, a ranking is determined for each segment of each group of repeated segments, but no more than one summary segment is selected from each group of repeated segments (e.g., possibly based on the temporal length of the segments and the summary time criteria).

In various embodiments, the respective rankings are determined using genre, type, and/or classification specific rules; a genre, type, and/or classification specific neural network, or a neural network configured to receive the genre, type, and/or classification of the media item as input. Continuing with the example of the audio and/or visual content of the media item being a song that is associated with a particular music genre, the respective rankings of the segments may be based on what sections of a song and/or musical moments are considered to be important and/or significant in that music genre. For example, for the music genre of classic rock, the guitar solo may be identified as musically important and/or significant. For the music genre of electronic dance music (EDM), the drop may be identified as musically important and/or significant. Thus, a segment comprising a section of the audio and/or visual content that is considered to be important and/or significant for the genre, type, and/or classification associated with the media item is determined to have a ranking indicating that the segment is highly representative of the audio and/or visual content.

Based on the respective ranks of the plurality of segments and possibly other criteria (e.g., summary time criteria), one or more summary segments are selected from the plurality of segments. For example, in the example of the song including three verses, three instances of the chorus, a bridge, and a guitar solo, the respective rankings may rank the group of segments corresponding to the chorus as the most representative of the audio and/or visual content as a whole, the segment comprising and/or corresponding to the guitar solo as the second most representative of the audio and/or visual content as a whole, each segment corresponding to a respective verse as the next most representative of the audio and/or visual content as a whole and the bridge as being less representative of the audio and/or visual content as a whole. In such an example, a representative segment of the group of segments corresponding to the chorus and the segment comprising and/or corresponding to the guitar solo may be selected as the summary segments. Thus, the summary segments are selected from the plurality of segments based on the respective rankings such that the summary segments provide a representation of the audio and/or visual content as a whole, rather than being a random clip of the audio and/or visual content.

In various embodiments, the summary segments are selected from the plurality of segments based at least in part on summary time criteria. For example, the summary time criteria may indicate a minimum run and/or play time for the content summary and/or a maximum run and/or play time for the content summary. In various embodiments, the minimum and/or maximum run and/or play time for the content summary are preset and/or predefined (e.g., independent of the media item and/or run and/or play time of the audio and/or visual content). In an example embodiment, the minimum and/or maximum run and/or play time for the content summary are determined based on the run and/or play time of the audio and/or visual content (e.g., the maximum run and/or play time for the content summary may be 10% or less of the run and/or play time of the audio and/or visual content), metadata of the media item (e.g., based on a genre, type, and/or classification associated with the media item), and/or the like.

Once the summary segments are selected, the content summary is generated by stitching together and/or linking the summary segments using corresponding segment transitions. In various embodiments, the segment transitions are generated to provide a smooth transition between two adjacent summary segments. For example, a segment transition may be characterized by one or more characteristics corresponding to a first summary segment and a second summary segment that are linked and/or stitched together via the segment transition. For example, the beginning of the segment transition may be characterized by one or more characteristics corresponding to the first summary segment and the end of the segment transition may be characterized by one or more characteristics of the second summary segment. Between the beginning and the end of the segment transition, the characterization of the segment transition may smoothly switch from the one or more characteristics of the first summary segment to the one or more characteristics of the second summary segment, such that a midpoint of the segment transition (e.g., a point chosen from between the beginning of segment transition and the end of the segment transition) is characterized by a combination of the one or more characteristics of the first summary segment to the one or more characteristics of the second summary segment.

For example, in various embodiments, the segments include trailing and/or leading stitching margins and the segment transition is generated by overlapping at least in part the trailing stitching margin of a first summary segment and the leading stitching margin of a second summary segment. In an example embodiment, a beat and/or timing/rhythm signature of the trailing stitching margin of the first summary segment and/or a beat and/or timing/rhythm signature of the leading stitching margin of the second summary segment are modified and/or adjusted to match one another and/or are synchronized in the corresponding segment transition. In an example embodiment, an intensity, brightness, and/or volume of the trailing stitching margin of the first summary segment is faded out (e.g., gradually reduced over the temporal length of trailing stitching margin) through the corresponding segment transition and/or an intensity, brightness, and/or volume of the leading stitching margin of the second summary segment is faded in (e.g., gradually increased over the length of the leading stitching margin) through the corresponding segment transition. For example, the segment transition is configured to reduce clicking or missed beats, in an example embodiment. In an example embodiment, the timing of the cross fades (e.g., fading out of the trailing stitching margin and fading in of the leading stitching margin) is determined based on the beat and/or timing/rhythm signature of the trailing stitching margin and/or the leading stitching margin, the number of bars and/or beats present in the trailing stitching margin and/or the leading stitching margin, and/or the like.

In an example embodiment, a segment i is defined, determined, and/or identified such that the segment run and/or play time $S_i$ for segment i includes the trailing and/or leading stitching margins. In an example embodiment, the segment i is defined, determined, and/or identified such that the trailing and/or leading stitching margins are in addition to the run and/or play time $S_i$ for the segment.

As indicated above, in various embodiments, the content summary is generated automatically by a content summarizing program (e.g., via execution of computer program code and/or computer executable instructions corresponding to the content summarizing program by the processing element 205). In various embodiments, the content summarizing program is a program comprises and/or calls (e.g., via API calls and/or the like) one or more neural networks, such as a recurrent neural network (RNN) (e.g., an LSTM network), a generative adversarial network (GAN), and/or other neural networks. For example, in various embodiments, the content summarizing program comprises one or more neural networks, and possibly other program portions, configured to perform various portions of the intelligent content summary generation and/or provision process as described herein. In an example embodiment, the content summarizing program operates in a modular fashion. In an example embodiment, one or more modules of the content summarizing program are associated with a particular genre, type, and/or classification and/or are genre, type and/or classification aware.

In various embodiments, the content summarizing program comprises and/or is in communication with (e.g., via API calls, and/or the like) one or more deep neural networks configured to perform at least a portion of generating an intelligent content summary. For example, in an example embodiment, an LSTM is used to determine and/or identify the plurality of segments of the audio and/or visual content. For example, in an example embodiment, the audio and/or visual content is provided to the content summarizing program in a computer-readable format (e.g., an audio and/or visual file format). The audio and/or visual content is processed by the content summarizing program to generate a spectrogram and/or other representation of the frequency, intensity, timing signature evolution of the audio and/or visual content. The spectrogram and/or other representation of the of the frequency, intensity, timing signature evolution of the audio and/or visual content is provided as input to the LSTM and the LSTM provides information defining and/or identifying a plurality of segments as output.

In another example, a GAN is used to generate one or more segment transitions. For example, a GAN may be used to generate segment transitions that are one or two beats and/or one or two seconds, for example, in length and that link the substance, presentation, sound, appearance, and/or the like of the first summary segment and the adjacent second segment.

In another example, a neural network (e.g., a classification network) and/or a clustering algorithm is used to identify and/or determine unique and repeated segments of the plurality of segments and/or to determine respective ranks for the plurality of segments. In an example embodiment, a neural network and/or clustering algorithm is associated with a particular genre, type, and/or classification and is selected for identifying and/or determining unique and repeated segments of the plurality of segments and/or respective ranks for the plurality of segments based on a genre, type, and/or classification associated with the audio and/or visual content. In an example embodiment, the neural network and/or clustering algorithm is configured to receive as input a genre, type, and/or classification associated with the audio and/or visual content and use that input during the identification and/or determination of the unique and repeated segments of the plurality of segments and/or respective ranks for the plurality of segments.

In various embodiments, a system computing entity 20 provides a media item and/or the audio and/or visual content of the media item, possibly along with a request for a corresponding content summary to be generated and/or provided. For example, the system computing entity 20 provides the media item and/or the audio and/or visual content of the media item (and, possibly, the request for the corresponding content summary to be generated and/or provided) such that the summarizing computing entity 200 receives the provides the media item and/or the audio and/or visual content of the media item (and, possibly, the request for the corresponding content summary to be generated and/or provided). For example, a system computing entity 20 may provide (e.g., transmit via network interface 320, provide audibly/visually via speakers/display 316) a media item and/or the audio and/or visual content of a media item such that a summarizing computing entity 30 receives the media item and/or the audio and/or visual content of the media item. For example, the summarizing computing entity 30 receives the media item and/or the audio and/or visual content thereof via network and/or communications interface 220, in an example embodiment. For example, the summarizing computing entity 30 receives the audio and/or visual content of the media item via audio/visual sensor(s) 225, in an example embodiment.

The media item, or at least the audio and/or visual content of the media item, is then provided to the content summarizing program in a computer-readable format. For example, in an example embodiment where the system computing entity 20 provides the audio and/or visual content as an audio and/or visual content file (e.g., a music file, video file, and/or the like) and/or a stream/packeted version thereof, the audio and/or visual content file or stream of the audio and/or visual content file is provided to the content summarizing program. In an example embodiment, the summarizing computing entity 30 converts the format of the received audio and/or visual content file to a desired file format and provides the converted audio and/or visual content file of the desired file format to the content summarizing program. In an example embodiment, the summarizing computing entity 30 receives the audio and/or visual content via the audio/visual sensor(s) 225 and stores a computer-readable encoding thereof to an audio and/or visual content file of a desired file format, which is then provided to the content summarizing program.

FIG. 4 provides a flowchart illustrating various processes, procedures, operations, and/or the like, performed by a content summarizing program operating on a summarizing computing entity 200, for example, for generating an intelligent content summary, in accordance with various embodiments. Starting at step/operation 402, a spectrogram representing the audio and/or visual content of the media item is generated. For example, the summarizing computing entity 30 may operate and/or execute the content summarizing program to generate a spectrogram representing the audio and/or visual content of the media item. For example, the summarizing computing entity 30 comprises means, such as processing element 205, non-volatile memory 210, volatile memory 215, and/or the like, for generating a spectrogram representing the audio and/or visual content of the media item. As used herein, a spectrogram is a representation of the intensity, brightness, and/or volume of audible and/or visual spectrum frequencies of the audio and/or visual content as a function of time (e.g., over the run and/or play time T from the initial time of the audio and/or visual content $t_0$ to the final time of the audio and/or visual content $t_f$).

FIG. 5 illustrates an example spectrogram 500 of an example audio and/or visual content consisting of audio content. As can be seen in FIG. 5, the spectrogram 500 illustrates how the intensity of sounds of various frequencies change over time over the duration of the corresponding audio and/or visual content. A point selected from the spectrogram indicates the intensity of the frequency indicated by the corresponding position along the vertical axis at the time indicated by the corresponding position along the horizontal axis.

Continuing with FIG. 4, at step/operation 404, the spectrogram (or another computer-readable representation of the audio and/or visual content) is analyzed and/or processed to generate, identify, define, and/or determine a plurality of segments of the audio and/or visual content of the media item. For example, the summarizing computing entity 30 may operate and/or execute the content summarizing program to analyze and/or process the spectrogram (or other computer-readable representation) representing the audio and/or visual content of the media item to generate, identify, define, and/or determine a plurality of segments of the audio and/or visual content. For example, the summarizing computing entity 30 comprises means, such as processing element 205, non-volatile memory 210, volatile memory 215, and/or the like, for analyzing and/or processing the spectrogram (or other computer-readable representation) representing the audio and/or visual content of the media item to generate, identify, define, and/or determine a plurality of segments of the audio and/or visual content.

FIG. 6A illustrates an example of a segmented spectrogram 600 corresponding to the spectrogram 500. For example, the segments 602A, 604A, 602B, 604B, 606, 602C, and 604C are defined. Each of the segments corresponds to a pattern or feature identified within the spectrogram 500, such that the segments 602A-C, 604A-C, and 606 start and/or end at times where the pattern and/or features within the spectrogram 500 change.

In various embodiments, a segment of the audio and/or visual content is a cohesive and complete section and/or portion of the audio and/or visual content. For example, a segment of the audio and/or visual content is defined based at least in part on a structure of the audio and/or visual content. In other words, a segment of the audio and/or visual content is a structurally relevant portion of the audio and/or visual content. For example, when the audio and/or visual content is a song, a segment may be a verse of the song, a stanza of a verse, an instance of a chorus, an instance of a refrain, a bridge, an intro, an outro, a musical interlude or portion thereof, and/or other structural piece of the song. However, in an example embodiment, a single word from a line of a verse would not be defined as a segment.

In various embodiments, digital signal processing techniques are used to generate, identify, and/or determine the segments of the audio and/or visual content based on analyzing and/or processing the spectrogram (or other computer-readable representation of the audio and/or visual content). In various embodiments, a trained neural network is used to analyze and/or process the spectrogram (or other computer-readable representation of the audio and/or visual content) to generate, identify, and/or determine segments of the audio and/or visual content. For example a trained RNN, such as an LSTM, is used to analyze and/or process the spectrogram (or other computer-readable representation of the audio and/or visual content) to generate, identify, and/or determine segments of the audio and/or visual content, in an example embodiment.

FIG. 6B illustrates an example architecture of an LSTM network 650 used to generate, identify, define, and/or determine the plurality of segments of the audio and/or visual content. The LSTM network 650 comprises an input layer, followed by a masking layer (used to accommodate inputs of different lengths and/or sizes), followed by a plurality (e.g., four) alternating sets of bi-directional LSTM (BLSTM) with bottleneck (BN) feature layer followed by an activation layer (e.g., a Parametric Rectified Linear Unit (PReLU) activation layer or a layer in which a PRELU activation function is implemented), followed by a drop-out layer (e.g., as a regularization method and to reduce overfitting), followed by at least one more alternating sets of a BLSTM with BN feature layer followed by an activation layer (e.g., a PRELU activation layer), followed by a prediction generation layer using the dense function, followed by another PRELU activation layer, a flattening layer, and a SoftMax activation layer (e.g., a layer implementing a SoftMax activation function) such that output indicting the segmentation of the audio and/or visual content is provided. In an example embodiment, the LSTM network 650 is trained using a supervised machine learning algorithm. As should be understood, the architecture of LSTM network 650 is illustrative of an example embodiment and various other LSTM, RNN, and/or other deep neural network architectures may be used to generate neural networks configured to generate, identify, define, and/or determine the plurality of segments of the audio and/or visual content based on processing of the spectrogram (or other computer-readable representation of the audio and/or visual content).

In an example embodiment, analyzing and/or processing the spectrogram (or other computer-readable representation of the audio and/or visual content) to generate, identify, define, and/or determine segments of the audio and/or visual content comprises detecting, identifying, and/or extracting features (e.g., high level features) from the spectrogram (or other computer-readable representation of the audio and/or visual content). For example, information regarding the amount of energy at different frequencies over time, the intensity at different frequency ranges over time, and/or the beat and/or timing/rhythm signature at various points in time within the media item are determined from the spectrogram, in an example embodiment. In an example embodiment, analyzing and/or processing the spectrogram (or other computer-readable representation of the audio and/or visual content) to generate, identify, and/or determine segments of the audio and/or visual content further comprises evaluating the detected and/or extracted features (e.g., high level features) to identify the segmentation subspace. For example, the detected and/or extracted features may correspond to patterns in the spectrogram, changes in a pattern identified in the spectrogram, occurrences of a high intensity and/or low intensity moment of one or more frequencies, and/or the like. In various embodiments, the features may indicate a segment boundary, and/or the like. Based at least in part on the identified and/or extracted features, the segments of the audio and/or visual content is generated, identified and/or determined. In an example embodiment, an $i^{th}$ segment is defined by defining the start time $s_{i0}$ and an end time $s_{if}$ of the $i^{th}$ segment, where i is an index used to index the segments of the audio and/or visual content.

Returning to FIG. 4, at step/operation 406, unique and repeated segments are identified. For example, the summarizing computing entity 30 may operate and/or execute the content summarizing program to identify unique and repeated segments. For example, the summarizing computing entity 30 comprises means, such as processing element 205, non-volatile memory 210, volatile memory 215, and/or the like, for identifying unique and repeated segments. As used herein a unique segment is a portion or section of the audio and/or visual content that is not substantially similar to any other segment of the audio and/or visual content of the media item and a repeated segment is a portion or section of the audio and/or visual content that is substantially similar to at least one other segment of the audio and/or visual content of the media item.

As used herein, two segments are substantially similar to one another when they correspond to different instances of the same portion of the audio and/or visual content. For example, two segments that are substantially similar may have a similar (dominant) pattern or feature(s) within the spectrogram. Two segments that are not substantially similar may not share a similar (dominant) pattern, may not share similar features, and/or the like in the spectrogram representation of the audio and/or visual content. For example, in an example embodiment, two segments are substantially similar when a cross-covariance of the portions of the spectrogram corresponding to the segments satisfies a threshold criteria (e.g., is greater than a threshold value). In an example embodiment, a neural network, such as a discriminator model and/or a classifier, is used to determine when two segments are substantially similar to one another. For example, segments 602A, 602B, and 602C are substantially similar to one another but are not substantially similar to segments 604A, 604B, 604C, and 606. Similarly, segments 604A, 604B, and 604C are substantially similar to one another, but are not substantially similar to 602A, 602B, 602C, and 606. Segment 606 is not substantially similar to any of the other segments. Thus, segments 602A-C and 604A-C are repeated segments and segment 606 is a unique segment.

In an example embodiment, the repeated segments may be grouped such that each repeated segment in a group of repeated segments is substantially similar to each of the other repeated segments in the group of repeated segments (e.g., each repeated segment in a particular group of repeated segments is a segment that corresponds to an respective instance of the chorus, in an example where the audio and/or visual content is a song). For example, segments 602A-C are one group of repeated segments that are all substantially similar to one another and segments 604A-C are different group of repeated segments. In an example embodiment, a representative segment is selected for each group of repeated segments. For example, the representative segment for a group of repeated segments may be the segment in the group of repeated segments with the smallest start time $s_{i0}$ (or end time $s_{if}$), corresponding to the first occurrence of the repeated segment in the audio and/or visual content, the largest start time $s_{i0}$ (or end time $s_{if}$), corresponding to the last occurrence of the repeated segment in the audio and/or visual content, and/or the like.

At step/operation 408, a plurality of respective rankings is determined for the segments of the audio and/or visual content is determined, where each respective ranking indicates how representative of the audio and/or visual content as a whole a corresponding segment is. For example, the summarizing computing entity 30 may operate and/or execute the content summarizing program to determine respective rankings for the plurality of segments of the audio and/or visual content. For example, the summarizing computing entity 30 comprises means, such as processing element 205, non-volatile memory 210, volatile memory 215, and/or the like, for determining a plurality of respective rankings for the plurality of segments of the audio and/or visual content.

A respective ranking is determined for each segment of the audio and/or visual content based on ranking criteria such that the rank associated with a segment indicates how representative of the audio and/or visual content as a whole the segment is. In various embodiments, one or more ranking rules are used to determine the plurality of respective rankings. In various embodiments, a ranking network (e.g., a neural network configured to determine respective rankings, such as a classifier or other ranking model) is configured to analyze the plurality of segments and determine the plurality of respective rankings. For example, based on patterns and/or features identified within the portions of the spectrogram corresponding to respective segments, a plurality of respective rankings is determined, with each respective ranking indicating how representative of the audio and/or visual content as a whole the segment is. In an example embodiment, the rankings are determined based on identified repeated themes (e.g., words, musical phrases, melody lines, audio and/or visual patterns, and/or the like), the recurrence frequency and/or number of occurrences of a theme, and/or the like. In various embodiments, the repeated themes, recurrence frequency and/or number of occurrences of the theme are determined based on analysis of the spectrogram (e.g., via segmentation and/or analysis of the spectrogram and/or segmented spectrogram by the ranking network and/or ranking module of the content summarizing program). For example, a segment comprising patterns and/or features that are repeated in other segments (e.g., unique segments and/or repeated segments), may be more representative of the audio and/or visual content as a whole than a segment that does not include any patterns or features that are present in other segments, in an example embodiment.

In an example embodiment, the respective ranking of a particular segment is determined at least in part based on a number of other segments (e.g., repeated segments in a same group of repeated segments) that are substantially similar to the particular segment. In an example embodiment, when repeated segments are grouped into groups of repeated segments, only the representative segment of the group of repeated segments is ranked. For example, the respective ranking determined for the representative segment of a group of repeated segments is an indication of how representative the group of repeated segments as a group are of the audio and/or visual content as a whole.

In an example embodiment, the plurality of respective rankings for the plurality of segments are determined at least in part based on a genre, type, and/or classification associated with the media item and/or the audio and/or visual content thereof. For example, a segment that includes a particular feature that is determined to be important for the genre, type, and/or classification of the media item may be assigned a high ranking even when that segment is a unique segment (e.g., the particular feature only occurs once in the media item). The particular features that are deemed important for different genres, types, and/or classifications are indicated, captured, and/or encoded by the genre, type, and/or classification specific rules and/or weights/parameters used to determine the segment rankings.

For example, in various embodiments, the respective rankings are determined using genre, type, and/or classification specific rules; a genre, type, and/or classification specific neural network, or a neural network configured to receive the genre, type, and/or classification of the media item as input. For example, in various embodiments, the metadata of the media item may be read to determine a genre, type, and/or classification of the media item. In an example embodiment, an algorithm and/or trained neural network (e.g., a classification network such as a genre identification network) is used to analyze the media item and/or the audio and/or content thereof and determine a genre, type, and/or classification for the media item. In an example embodiment, the genre, type, and/or classification may be provided as input to an algorithm and/or neural network used to determine the plurality of rankings such that one or more rules and/or weights/parameters of the neural network may be selected for use based on the genre, type, and/or classification of the media item. In an example embodiment, a genre, type, and/or classification specific algorithm and/or neural network is selected for use in determining the plurality of rankings based on the genre, type, and/or classification of the media item.

At step/operation 410, the summary segments are selected based on the respective rankings and, possibly other criteria (e.g., summary time criteria) and a summary segment order is determined. The content summary generated for the media item comprises the summary segments in the time order of the summary segment order. For example, the summarizing computing entity 30 may operate and/or execute the content summarizing program to select one or more summary segments from the plurality of segments and determine a summary segment order. For example, the summarizing computing entity 30 comprises means, such as processing element 205, non-volatile memory 210, volatile memory 215, and/or the like, for selecting one or more summary segments from the plurality of segments and determining a summary segment order.

Based on the respective ranks of the plurality of segments and possibly other criteria (e.g., summary time criteria), one or more summary segments are selected from the plurality of segments. For example, in an example embodiment, a number of segments of the plurality of segments that have the highest respective rankings, indicating that the number of segments are the most representative segments of the audio and/or visual content as a whole, are selected as the summary segments. In an example embodiment, the number of segments is a set number of segments (e.g., two, three, four, five, and/or the like). In an example embodiment, the number of segments is determined based on a run and/or play time S of each selected summary segment and summary time criteria. In various embodiments, the summary segments are selected from the plurality of segments based at least in part on summary time criteria. For example, the summary time criteria may indicate a minimum run and/or play time for the content summary and/or a maximum run and/or play time for the content summary. For example, the number of summary segments selected and/or the particular summary segments selected may be configured to provide a content summary having run and/or play time that is at least the minimum run and/or play time and/or no longer than the maximum run and/or play time indicated by the summary time criteria.

In various embodiments, the minimum and/or maximum run and/or play time for the content summary are preset and/or predefined (e.g., independent of the media item and/or run and/or play time of the audio and/or visual content). In an example embodiment, the minimum and/or maximum run and/or play time for the content summary are determined based on the run and/or play time of the audio and/or visual content (e.g., the maximum run and/or play time for the content summary may be 10% or less of the run and/or play time of the audio and/or visual content), metadata of the media item (e.g., based on a genre, type, and/or classification associated with the media item), and/or the like.

In an example embodiment, the summary segments are selected such that a particular summary segment is not substantially similar to any of the other summary segments. For example, only one repeated segment (e.g., the representative segment of a group of repeated segments) is selected from a group of repeated segments for inclusion as a summary segment.

In various embodiments, a summary segment order is determined. In various embodiments, the summary segment order is determined based on the start time $s_{i0}$ (or end time $s_{if}$) of the summary segments such that the summary segments appear in the content summary in the order in which they appear in the audio and/or visual content of the media item. In various embodiments, the summary segment order is determined based on the respective rankings for each of the summary segments. For example, the summary segment order may corresponding to increasing respective rankings, decreasing respective rankings, and/or another particular ordering of the respective rankings. For example, the summary segment order may be configured such that the content summary begins with the highest ranked summary segment, ends with the second highest ranked summary segment, and includes the lower ranked summary segment(s) in the middle of the content summary. Various summary segment orders may be defined in various embodiments, as appropriate for the application.

At step/operation 412, one or more segment transitions are generated. In various embodiments, a segment transition is generated for each transition between summary segments when the summary segments are ordered in accordance with the summary segment order. For example, when three summary segments are selected from the plurality of segments of the audio and/or visual content, and the three summary segments ordered in accordance with the summary segment order are Segment A, Segment B, and Segment C, a segment transition is generated for the transition between Segment A and Segment B and another segment transition is generated for the transition between Segment B and Segment C. For example, the summarizing computing entity 30 may operate and/or execute the content summarizing program to generate one or more segment transitions. For example, the summarizing computing entity 30 comprises means, such as processing element 205, non-volatile memory 210, volatile memory 215, and/or the like, for generating one or more segment transitions.

In various embodiments, the segment transitions are generated to provide a smooth transition between two adjacent summary segments. For example, a segment transition may be characterized by one or more characteristics corresponding to a first summary segment and a second summary segment that are linked and/or stitched together via the segment transition. For example, the beginning of the segment transition may be characterized by one or more characteristics (e.g., beat and/or timing/rhythm signature, intensity (e.g., volume and/or brightness), frequency spectra/distribution(s), and/or the like) corresponding to the first summary segment and the end of the segment transition may be characterized by one or more characteristics (e.g., beat and/or timing/rhythm signature, intensity (e.g., volume and/or brightness), frequency spectra/distribution(s), and/or the like) of the second summary segment.

Between the beginning and the end of the segment transition, the characterization of the segment transition may smoothly switch from the one or more characteristics of the first summary segment to the one or more characteristics of the second summary segment, such that a midpoint of the segment transition (e.g., a point chosen from between the beginning of segment transition and the end of the segment transition) is characterized by a combination of the one or more characteristics of the first summary segment to the one or more characteristics of the second summary segment. For example, during the segment transition, the beat and/or timing/rhythm signature may be modified (e.g., stretched, compressed, and/or the like) to synchronize the beat and/or timing/rhythm signature between the first summary segment and the following second summary segment. In another example, during the segment transition, the frequency spectra/distribution(s) may be modified from a beginning of the segment transition to the end of the segment transition to smoothly (e.g., continuously) switch from frequency spectra/distribution(s) that characterize the end of the first summary segment to frequency spectra/distribution(s) that characterize the beginning of the second summary segment.

In various embodiments, the segment transition is generated by synchronizing the beat and/or timing/rhythm signature of the first summary segment and the second summary segment within the segment transition, fading out the frequency spectra/distribution(s) of the first summary segment, and fading in the frequency spectra/distribution(s) of the second summary segment. For example, if the audio and/or visual content consists of audio content only, the volume of the first summary segment may be continuously and/or smoothly reduced from 100% at the beginning of the segment transition to 0% at the end of the segment transition. Similarly, the volume of the second summary segment may be continuously and/or smooth increased from 0% at the beginning of the segment transition to 100% at the end of the segment transition. For example, a crossfade and/or smoothing function may be used to generate the segment transition based on characteristics of the end of the first summary segment and characteristics of the beginning of the second summary segment. In various embodiments, the audio portion of the segment transition includes an audio crossfade and/or the visual portion of the segment transition includes a wash transition. In various embodiments, the temporal length of the segment transition is short compared to the length of the preview (e.g., one to two seconds or less).

For example, in various embodiments, the (summary) segments include trailing stitching margins and/or leading stitching margins and the segment transition is generated by overlapping at least in part the trailing stitching margin of a first summary segment and the leading stitching margin of a second summary segment. For example, leading stitching margin 614 is a short portion of the audio and/or visual content that immediately precedes and/or begins the segment 604A. Similarly, trailing stitching margin 612 is a short portion of the audio and/or visual content that immediately follows and/or ends the segment 602A. In various embodiments, a stitching margin (a trailing or leading stitching margin) is short compared to the run and/or play time of the corresponding segment. For example, a stitching margin (e.g., trailing and/or leading stitching margin) may have a temporal length of five beats or less. For example, a stitching margin (e.g., trailing and/or leading stitching margin) may have a temporal length of two seconds or less (e.g., a temporal length of a few hundred milliseconds). For example, a stitching margin (e.g., trailing and/or leading stitching margin) may have a temporal length that is less than 1-5% of the run and/or play time of the corresponding segment, in various embodiments. In various embodiments, the temporal length of the stitching margin (e.g., trailing and/or leading stitching margin) is determined based on the audio and/or visual content of the media item; the beat and/or rhythm/timing signature of the corresponding segment; the genre, type, and/or classification of the media item; and/or the like. In an example embodiment, a neural network (e.g., the generative network of a GAN) is used to generate the segment transition and determines the temporal length of the stitching margin(s) (e.g., trailing and/or leading stitching margin) used to generate the segment transition.

In an example embodiment, a segment i is defined, determined, and/or identified such that the segment run and/or play time $S_i$ for segment i includes the trailing and/or leading stitching margins. In an example embodiment, the segment i is defined, determined, and/or identified such that the trailing and/or leading stitching margins are in addition to the run and/or play time $S_i$ for the segment.

In an example embodiment, a beat and/or timing/rhythm signature of the trailing stitching margin of the first summary segment and/or a beat and/or timing/rhythm signature of the leading stitching margin of the second summary segment are modified and/or adjusted to match one another and/or are synchronized in the corresponding segment transition. In an example embodiment, an intensity, brightness, and/or volume of the trailing stitching margin of the first summary segment is faded out (e.g., slowly and/or gradually reduced) through the corresponding segment transition and/or an intensity, brightness, and/or volume of the leading stitching margin of the second summary segment is faded in (e.g., slowly and/or gradually increased) through the corresponding segment transition. For example, the segment transition is configured to reduce clicking or missed beats, in an example embodiment.

For example, FIG. 7 illustrates the example generation of a segment transition 710, in accordance with an example embodiment. The segment transition 710 is a transition between a first summary segment 702 having a beat and/or timing/rhythm signature 722 and a trailing stitching margin 712 and a second summary segment 704 having a beat and/or timing/rhythm signature 724 and a leading stitching margin 714. The segment transition 710 is generated, in the illustrated embodiment, by overlapping the trailing stitching margin 712 and the leading stitching margin 714, synchronizing the beat and/or timing/rhythm signatures of the first and second summary segment in the trailing stitching margin 712 and the leading stitching margin 714, reducing the intensity and/or volume 732 from 100% to 0% of the intensity of the segment transition in a continuous manner across the segment transition 710, and increasing the intensity and/or volume 734 from 0% to 100% of the intensity of the segment transition in a continuous manner across the segment transition 710. In an example embodiment, the segment transition is generated by a neural network. For example, a GAN may be trained to take as input the first summary segment and the second summary segment that are to be linked and/or stitched together via the segment transition (and/or a portion thereof such as the trailing stitching margin of the first summary segment and the leading stitching margin of the second summary segment) and, based thereon, generate a segment transition 710 for transitioning between the first summary segment and the second summary segment. In general, a GAN is trained as a paired generator network and discriminator network. The generator network is trained to generate content (e.g., segment transitions) and the discriminator network is trained to identify content generated by the generator network compared to small portions of the content that are present in audio and/or visual content of one or more genres, types, and/or classifications. For example, the GAN could be trained to receive the genre, type, and/or classification of a media item as input and/or the GAN could be trained to be used specifically for generating segment transitions for content summaries of media items of one or more specific genres, types, and/or classifications, in various embodiments.

Returning to FIG. 4, at step/operation 414, the content summary is generated by stitching together the summary segments in accordance with the summary segment order using the corresponding segment transitions. For example, the summarizing computing entity 30 may operate and/or execute the content summarizing program to generate the content summary by stitching and/or linking together the summary segments in accordance with the summary segment order using the corresponding segment transitions. For example, the summarizing computing entity 30 comprises means, such as processing element 205, non-volatile memory 210, volatile memory 215, and/or the like, for generating the content summary by stitching and/or linking together the summary segments in accordance with the summary segment order using the corresponding segment transitions. In various embodiments, the content summary is generated to avoid clicking and/or missed beats when transition between adjacent summary segments. For example, the segment transitions used to stitch together adjacent pairs of summary segments (e.g., a first summary segment and a second summary segment) are configured to prevent clicking and/or missed beats between the first summary segment and the second summary segment. As should be understood, in various embodiments, the content summary may include any number of summary segments with adjacent summary segments stitched and/or linked together using respective segment transitions.

For example, FIG. 8 illustrates an example spectrogram 800 of a content summary generated by stitching and/or linking together segments 602A, 604A, and 606. In an example embodiment, since segments 602A and 604A are adjacent segments in the audio and/or visual content (e.g., there are no segments disposed segments 602A and 604A in FIG. 6A) an endogenous transition 803 is used to transition between segment 602A and segment 604A in the content summary. In other words, in an example embodiment, when two segments that are adjacent to one another in the audio and/or visual content are to be adjacent summary segments in the content summary, the two segments may be treated as one combined summary segment 808. In an example embodiment, a segment transition is generated for each adjacent pair of summary segments, even if the adjacent pair of summary segments are adjacent segments in the audio and/or visual content as well. A generated segment transition 810 is used to stitch together the adjacent pair of summary segments including segment 604A as the first summary segment and segment 606 as the second summary segment. As shown in FIG. 8, the content summary has a run and/or play time $T_S=t_s-t_0<T$. In various embodiments, the run and/or play time $T_S$ of the content summary satisfies the summary time criteria.

Continuing with FIG. 4, at step/operation 416, the content summary is provided as output of the content summarizing program. For example, the summarizing computing entity 30 may operate and/or execute the content summarizing program to provide the content summary as output. For example, the summarizing computing entity 30 comprises means, such as processing element 205, non-volatile memory 210, volatile memory 215, and/or the like, for providing the content summary as output. For example, in various embodiments, the content summary is provided as output by providing a content summary media item which is a file encoding the content summary in an audio and/or video file format. For example, the content summary media item may be stored (e.g., in memory 210, 215), transmitted (e.g., via network and/or communications interface 220), and/or provided for user consumption (e.g., via a user interface).

For example, the summarizing computing entity 200 may provide (e.g., transmit) a content summary media item comprising and/or encoding the content summary corresponding to the media item (e.g., comprising metadata identifying the media item and/or the like) such that the system computing entity 20 and/or one or more user computing entities 30 receive the content summary media item. For example, the system computing entity 20 may store the content summary media item in memory thereof (e.g., memory 322, 324), include the content summary media item in a catalog comprising the media item (e.g., possibly in association with the media item), and/or the like.

In an example embodiment, the content summary media item is configured such that upon receiving and/or processing the content summary media item, a user computing entity 30 is caused to provide the content summary in a human perceivable format via a user interface (e.g., speaker(s), display 316, and/or the like) of the user computing entity 30. For example, any audio content of the content summary may be audibly provided (e.g., via one or more speakers in communication with the user computing entity 30). For example, any visual content of the content summary may be visibly provided (e.g., via one or more displays 316). In an example embodiment, the summarizing computing entity 200 and/or the system computing entity 30 may stream the content summary such that the user computing entity 30 receives the content summary and provides the content summary via a user interface (e.g., speaker(s), display 316, and/or the like) of the user computing entity 30.

As elsewhere described herein, the content summarizing program, in various embodiments, is a program comprising at least one neural network and/or is configured to call at least one neural network to perform at least one process, procedure, operation, and/or function of the program. While described herein as a single program, the content summarizing program, is a processing pipeline, in various embodiments. For example, the content summarizing program may be a string of programs and/or modules configured to provide the output of one module as the input of the next module.

As described above, in various embodiments, a user may access a content summary via a website, application, and/or other user interface (e.g., graphical user interface). FIG. 9 illustrates an example graphical user interface 900 displayed via a display 316 of a user computing entity 30. In an example embodiment, the graphical user interface 900 is provided via a website provided by a system computing entity 20 and accessed via a web browser operating on the user computing entity 30. In an example embodiment, the graphical user interface 900 is provided via an application operating at least in part on the user computing entity 30. In an example embodiment, the graphical user interface 900 is provided via a distributed application that operates at least in part on the system computing entity 20 and/or in a Cloud-based computing environment. The graphical user interface 900 is merely provided as one example user graphical user interface. As should be understood, the functionality described with respect to graphical user interface 900 may be incorporated into a variety of different user interfaces, as appropriate for the application.

In an example embodiment, the user logs in to a website, application, and/or the like associated with the graphical user interface 900. In other words, a user profile corresponding to the user may exist (e.g., be stored by memory of the user computing entity 30 and/or in a user database stored by a system computing entity 200. For example, the graphical user interface 900 may include a user name and/or user identifier 902. The illustrated graphical user interface 900 comprises a selectable user interface element 904 configured to, when interacted with by a user via an input device of the user interface of the user computing entity 30, cause the purchase of Media Item A by the user (e.g., rights associated with Media Item A to be assigned to the corresponding user profile, possibly in exchange for a monetary, token, and/or other payment or exchange), cause Media Item A to be added to an electronic shopping cart associated with the user profile, and/or the like. The illustrated graphical user interface 900 comprises a selectable user interface element 906 configured to, when interacted with by a user via an input device of the user interface of the user computing entity 30, cause the content summary corresponding to Media Item A to be provided via one or more output devices (e.g., display, speakers, and/or the like) of the user interface of and/or in communication with the user computing entity 30. The illustrated graphical user interface 900 further comprises various information 908 regarding Media Item A, the creators of Media Item A, owners of various rights corresponding to Media Item A, purchase and/or licensing options available for Media Item A, and/or the like.

In an example embodiment, when the user computing entity 30 receives an indication of user input selecting the selectable user interface element 906, the user computing entity 30 provides (e.g., transmits) a request for the content summary corresponding to Media Item A. A system computing entity 20 and/or summarizing computing entity 200 receives the request and returns the appropriate content summary (e.g., as streaming media, a content summary media item, and/or the like). The user computing entity 30 receives the content summary and provides (e.g., via display 316, speaker(s), and/or the like) the content summary for consumption by the user. Since the content summary is configured to be representative of the audio and/or visual content of the corresponding media item (e.g., Media Item A), the content summary provides the user with a comprehensive preview of Media Item A. Thus, the user's experience is improved because, rather than merely previewing a continuous thirty second clip of Media Item A, the user is able to consume a preview of Media Item A that is a representation of the audio and/or visual content of Media Item A as a whole.

In an example embodiment, the content summary is an audience-specific content summary generated for a particular audience. For example, in various embodiments, an audience-specific content summary is a content summary that is generated for provision to users corresponding to user profiles indicating particular demographics, interests, geographical location, and/or the like. In various embodiments, audience-specific content summaries are generated by applying audience-specific summary time criteria, audience-specific ranking rules and/or weights/parameters, and/or the like. For example, it may be determined that users having a particular demographic group (e.g., age category, etc.) tend to prefer slightly longer content summaries than users of a different demographic group. Thus, the summary time criteria used to select summary segments from the plurality of segments may be modified to be audience-specific, in various embodiments. In another example, the plurality of respective rankings may be audience-specific to reflect user group preferences. For example, the ranking rules used to determine the plurality of respective rankings may be audience-specific. In another example, a neural network configured to determine the plurality of respective rankings may be configured to receive demographic information as input and adjust and/or select one or more weights and/or parameters of the neural network based thereon. In another example, an audience-specific neural network may be selected to determine the plurality of rankings based on an intended audience for the resulting audience-specific content summary.

In an example embodiment, wherein audience-specific content summaries are provided, responsive to receiving an indication of user input selecting the selectable user input element 906 via an input device of the user interface of the user computing entity 30, a content summary request may be generated that includes audience information extracted from the corresponding user profile. Upon receiving and/or processing the request including audience information, the system computing entity 20 and/or summarizing computing entity 200 may determine whether an appropriate audience-specific content summary corresponding to Media Item A is available (e.g., stored in memory, a media item catalog, and/or the like). When it is determined that an appropriate audience-specific content summary corresponding to Media Item A is available, the system computing entity 20 and/or summarizing computing entity 200 provides the appropriate audience-specific content summary corresponding to Media Item A. When it is determined that an appropriate audience-specific content summary corresponding to Media Item A is not available, in an example embodiment, the system computing entity 20 and/or summarizing computing entity 200 provides a non-audience-specific content summary corresponding to Media Item A. When it is determined that an appropriate audience-specific content summary corresponding to Media Item A is not available, in an example embodiment, the summarizing computing entity 200 (possibly in response to a request received by the summarizing computing entity 200 and generated/provided by the system computing entity 20) generates an appropriate audience-specific content summary corresponding to Media Item A in a just-in-time manner. For example, the summarizing computing entity 200 may generate the appropriate audience-specific content summary corresponding to Media Item A in real time and/or near real time with respect to receiving the request for and/or determining that appropriate audience-specific content summary corresponding to Media Item A was not available. the audience-specific content summary is then provided such that the user computing entity 30 receives and provides (e.g., via display 316, speaker(s), and/or the like) the audience-specific content summary.

V. TECHNICAL ADVANTAGES

Various embodiments provide a variety of technical improvements over traditional audio and/or visual content previews. As noted elsewhere herein, conventional audio and/or visual content previews tend to be a brief continuous clip of the audio and/or visual content. For example, an example of a conventional preview of audio and/or visual content is the first thirty seconds of the audio and/or visual content. However, conventional previews fail to provide a comprehensive preview of the audio and/or visual content as a whole, fail to take into account the genre, type, and/or classification of media items comprising the audio and/or visual content, and fail to personalize the preview for a particular user and/or user group.

Various embodiments provide improved previews of audio and/or visual content by generating intelligent content summaries in an automated manner using a content summarizing program. In various embodiments, the content summarizing program is a program that comprises and/or is configured to call one or more neural networks for performance of various processes, procedures, operations, functions, and/or the like of the content summarizing program. Moreover, the content summaries provided by various embodiments are genre, type, and/or classification aware and/or audience-specific. Thus, the intelligent content summaries generated by various embodiments provides improved content summaries in an automated manner. Thus, various embodiments provide an improved user experience of the content summaries and/or graphical user interfaces (e.g., websites, applications, and/or the like) through which the user access content summaries. Various embodiments provide the further technical advantages of being able to generate intelligent content summaries in a just-in-time manner, generate catalogs comprising intelligent content summaries, and/or the like, with minimal human technician time and/or labor.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory storing computer executable instructions, the at least one memory and computer executable instructions configured to, with the at least one processor, cause the apparatus to at least:
 provide a media item comprising audio and/or visual content in a computer-readable format as an input to a content summarizing program, wherein at least one of (a) the content summarizing program comprises at least one neural network or (b) the content summarizing program is configured to call at least one neural network;
 operate the content summarizing program to:
  process the audio and/or visual content to determine a plurality of segments of the audio and/or visual content;
  determine a plurality of respective rankings, each respective ranking corresponding to one segment of the plurality of segments, wherein the respective ranking indicates how representative of the audio and/or visual content as a whole the segment is, and wherein determining the plurality of respective rankings comprises:
   identifying unique segments that are dissimilar to all other segments based on a similarity threshold;
   identifying one or more groups of repeated segments, wherein two or more segments of a group of repeated segments are substantially similar to one another based on the similarity threshold; and
   ranking each group of the one or more groups of repeated segments based at least in part on a number of repeated segments within the group, such that a first group of repeated segments including a greater number of repeated segments than a second group of repeated segments is ranked higher than the second group of repeated segments, wherein a first repeated segment of the first group of repeated segments is not substantially similar to a second repeated segment of a second group of repeated segments;
  based on the plurality of respective rankings and summary time criteria, select summary segments from the plurality of segments;
  based on the summary segments, generate a segment transition, wherein the segment transition corresponds to a pair of adjacent summary segments and comprises characteristics of both a first summary segment of the pair of adjacent summary segments and a second summary segment of the pair of adjacent summary segments; and
  stitch together the summary segments using the segment transition to generate a content summary, wherein the summary segments are stitched together such that the segment transition is disposed between the first summary segment and the second summary segment, the plurality of segments are determined to include stitching margins, a trailing stitching margin of a first segment of the plurality of segments overlaps, at least in part, a leading stitching margin of a second segment of the plurality of segments, the second segment follows the first segment in the audio and/or visual content, and generating the segment transition comprises adjusting a rhythm signature of at least one of the trailing stitching margin of the first summary segment or of the leading stitching margin of the second summary segment; and
 receive the content summary as output from the content summarizing program.

2. The apparatus of claim 1, wherein the audio and/or visual content has a temporal length and each segment of the plurality of segments corresponds to a respective portion of the temporal length.

3. The apparatus of claim 1, wherein the summary time criteria comprise at least one of (a) a minimum time length of the content summary or (b) a maximum time length of the content summary.

4. The apparatus of claim 1, wherein the first summary segment is not substantially similar to any other of the summary segments based on the similarity threshold.

5. The apparatus of claim 1, wherein the content summarizing program comprises a long short term memory (LSTM) network configured to receive the audio and/or visual content at an input layer thereof, process the audio and/or visual content to determine the plurality of segments, and provide information identifying the plurality of segments at an output layer thereof.

6. The apparatus of claim 1, wherein the content summarizing program comprises a generative adversarial network configured to generate the segment transition based on at least a portion of the first summary segment and at least a portion of the second summary segment.

7. The apparatus of claim 1, wherein the content summarizing program comprises a ranking network configured to determine the plurality of respective rankings based on processing the plurality of segments.

8. The apparatus of claim 7, wherein one of (a) the ranking network is configured to receive a genre associated with the audio and/or visual content as input or (b) is selected from one or more ranking networks by the content summarizing program based on the genre associated with the audio and/or visual content.

9. The apparatus of claim 8, wherein the genre associated with the audio and/or visual content is determined by (a) analyzing the audio and/or visual content with a genre identification network or (b) reading the genre from meta data associated with the audio and/or visual content.

10. The apparatus of claim 7, wherein one of (a) the ranking network is configured to receive user profile information corresponding to an intended audience of the content summary as input or (b) is selected from one or more ranking networks by the content summarizing program based on the user profile information corresponding to the intended audience of the content summary.

11. The apparatus of claim 1, wherein the at least one memory and the computer executable instructions are further configured to, with the at least one processor, cause the apparatus to at least one of (a) store the content summary in the at least one memory in an audio and/or visual file format, (b) transmit the content summary such that the content summary is received by at least one of a user computing entity or a system computing entity, or (c) cause a user interface of a computing entity to provide the content summary in a human perceivable format.

12. The apparatus of claim 1, wherein adjusting the rhythm signature of the trailing stitching margin of the first summary segment comprises synchronizing at least one of a beat or rhythm signature of the audio and/or visual content within the trailing stitching margin with the at least one of the beat or rhythm signature of the audio and/or visual content in the leading stitching margin and generating the segment transition further comprises reducing an intensity of the trailing stitching margin while increasing an intensity of the leading stitching margin.

13. A method for automated generation and provision of a content summary for a media item, the method comprising:
providing, by one or more processors, the media item comprising audio and/or visual content in a computer-readable format as an input to a content summarizing program, wherein at least one of (a) the content summarizing program comprises at least one neural network or (b) the content summarizing program is configured to call at least one neural network;
operating, by the one or more processors, the content summarizing program to:
process the audio and/or visual content to determine a plurality of segments of the audio and/or visual content;
determine a plurality of respective rankings, each respective ranking corresponding to one segment of the plurality of segments, wherein the respective ranking indicates how representative of the audio and/or visual content as a whole the segment is, and wherein determining the plurality of respective rankings comprises:
identifying unique segments that are dissimilar to all other segments based on a similarity threshold;
identifying one or more groups of repeated segments, wherein two or more segments of a group of repeated segments are substantially similar to one another based on the similarity threshold; and
ranking each group of the one or more groups of repeated segments based at least in part on a number of repeated segments within the group, such that a first group of repeated segments including a greater number of repeated segments than a second group of repeated segments is ranked higher than the second group of repeated segments, wherein a first repeated segment of the first group of repeated segments is not substantially similar to a second repeated segment of a second group of repeated segments;
based on the plurality of respective rankings and summary time criteria, select summary segments from the plurality of segments;
based on the summary segments, generate a segment transition, wherein the segment transition corresponds to a pair of adjacent summary segments and comprises characteristics of both a first summary segment of the pair of adjacent summary segments and a second summary segment of the pair of adjacent summary segments; and
stitch together the summary segments using the segment transition to generate a content summary, wherein the summary segments are stitched together such that the segment transition is disposed between the first summary segment and the second summary segment, the plurality of segments are determined to include stitching margins, a trailing stitching margin of a first segment of the plurality of segments overlaps, at least in part, a leading stitching margin of a second segment of the plurality of segments, the second segment follows the first segment in the audio and/or visual content, and generating the segment transition comprises adjusting a rhythm signature of at least one of the trailing stitching margin of the first summary segment or of the leading stitching margin of the second summary segment; and
receiving, by the one or more processors, the content summary as output from the content summarizing program.

14. The method of claim 13, wherein processing the audio and/or visual content to determine the plurality of segments of the audio and/or visual content comprises:

processing the audio and/or visual content to generate a representation of intensity of audible and/or visual spectrum frequencies of the audio and/or visual content as a function of time; and processing the representation of intensity of audible and/or visual spectrum frequencies of the audio and/or visual content as a function of time to determine the plurality of segments of the audio and/or visual content.

15. The method of claim 14, wherein the plurality of segments of the audio and/or visual content are determined based at least in part on one or more patterns identified in the representation of intensity of audible and/or visual spectrum frequencies of the audio and/or visual content as a function of time.

16. The method of claim 13, wherein the first summary segment is not substantially similar to any other of the summary segments.

17. The method of claim 13, wherein adjusting the rhythm signature of the trailing stitching margin of the first summary segment comprises synchronizing at least one of a beat or rhythm signature of the audio and/or visual content within the trailing stitching margin with the at least one of the beat or rhythm signature of the audio and/or visual content in the leading stitching margin and generating the segment transition further comprises reducing an intensity of the trailing stitching margin while increasing an intensity of the leading stitching margin.

18. The method of claim 13, wherein the content summarizing program comprises at least one of:
(a) a long short term memory (LSTM) network configured to receive the audio and/or visual content at an input layer thereof, process the audio and/or visual content to determine the plurality of segments, and provide information identifying the plurality of segments at an output layer thereof,
(b) comprises a generative adversarial network configured to generate the segment transition based on at least a portion of the first summary segment and at least a portion of the second summary segment, or
(c) a ranking network configured to determine the plurality of respective rankings based on processing the plurality of segments.

19. The method of claim 13, wherein the plurality of respective rankings are determined based at least in part one at least one of (a) a genre of the media item or (b) user profile information of an intended audience of the content summary.

20. A computer program product comprising at least one non-transitory computer-readable storage medium having computer-executable instructions stored therein, the computer-executable instructions comprising computer program code instructions corresponding to a content summarizing program, the computer program code instructions, when executed by a processor of a summarizing computing entity, are configured to:
provide a media item comprising audio and/or visual content in a computer-readable format as an input to the content summarizing program, wherein at least one of (a) the content summarizing program comprises at least one neural network or (b) the content summarizing program is configured to call at least one neural network;
operate the content summarizing program to:
process the audio and/or visual content to determine a plurality of segments of the audio and/or visual content;
determine a plurality of respective rankings, each respective ranking corresponding to one segment of the plurality of segments, wherein the respective ranking indicates how representative of the audio and/or visual content as a whole the segment is and wherein determining the plurality of respective rankings comprises:
identifying unique segments that are dissimilar to all other segments based on a similarity threshold;
identifying one or more groups of repeated segments, wherein two or more segments of a group of repeated segments are substantially similar to one another based on the similarity threshold; and
ranking each group of the one or more groups of repeated segments based at least in part on a number of repeated segments within the group, such that a first group of repeated segments including a greater number of repeated segments than a second group of repeated segments is ranked higher than the second group of repeated segments, wherein a first repeated segment of the first group of repeated segments is not substantially similar to a second repeated segment of a second group of repeated segments;
based on the plurality of respective rankings and summary time criteria, select summary segments from the plurality of segments;
based on the summary segments, generate a segment transition, wherein the segment transition corresponds to a pair of adjacent summary segments and comprises characteristics of both a first summary segment of the pair of adjacent summary segments and a second summary segment of the pair of adjacent summary segments; and
stitch together the summary segments using the segment transition to generate a content summary, wherein the summary segments are stitched together such that the segment transition is disposed between the first summary segment and the second summary segment, the plurality of segments are determined to include stitching margins, a trailing stitching margin of a first segment of the plurality of segments overlaps, at least in part, a leading stitching margin of a second segment of the plurality of segments, the second segment follows the first segment in the audio and/or visual content, and generating the segment transition comprises adjusting a rhythm signature of at least one of the trailing stitching margin of the first summary segment or of the leading stitching margin of the second summary segment; and
receive the content summary as output from the content summarizing program.

* * * * *